(12) United States Patent
Fujiune

(10) Patent No.: US 7,450,483 B2
(45) Date of Patent: Nov. 11, 2008

(54) INFORMATION CARRIER APPARATUS AND INFORMATION CARRIER ECCENTRICITY CORRECTION METHOD

(75) Inventor: Kenji Fujiune, Osaka (JP)

(73) Assignee: Panasonic Corporation, Kadoma (JP)

( * ) Notice: Subject to any disclaimer, the term of this patent is extended or adjusted under 35 U.S.C. 154(b) by 669 days.

(21) Appl. No.: 10/818,142

(22) Filed: Apr. 5, 2004

(65) Prior Publication Data

US 2004/0213108 A1    Oct. 28, 2004

(30) Foreign Application Priority Data

Apr. 28, 2003    (JP) .............................. 2003-124045

(51) Int. Cl.
*G11B 7/095*    (2006.01)

(52) U.S. Cl. .............. 369/53.14; 369/44.32; 369/53.12; 369/53.13

(58) Field of Classification Search .............. 369/53.12, 369/53.14, 44.32, 53.13
See application file for complete search history.

(56) References Cited

U.S. PATENT DOCUMENTS

| | | | |
|---|---|---|---|
| 4,985,882 A * | 1/1991 | Tanaka et al. ............ | 369/44.32 |
| 5,042,021 A * | 8/1991 | Nagano et al. ........... | 369/44.32 |
| 5,615,191 A * | 3/1997 | Takeda et al. ............ | 360/51 |
| 5,901,121 A * | 5/1999 | Yamashita et al. ....... | 369/44.28 |
| 6,304,528 B1 * | 10/2001 | Kanda et al. ............. | 369/44.28 |
| 6,452,882 B1 * | 9/2002 | Fukamachi .............. | 369/53.14 |
| 7,257,062 B2 * | 8/2007 | Li et al. .................... | 369/47.44 |
| 2001/0019525 A1 * | 9/2001 | Chan ....................... | 369/53.14 |
| 2002/0024899 A1 * | 2/2002 | Cho et al. ................ | 369/44.32 |
| 2003/0016599 A1 * | 1/2003 | Watanabe ................ | 369/44.32 |
| 2003/0090979 A1 * | 5/2003 | Takahashi ................ | 369/53.22 |

FOREIGN PATENT DOCUMENTS

| | | |
|---|---|---|
| JP | 2001-307342 | 2/2001 |
| JP | 2001-160226 | 12/2001 |
| JP | 2002-251749 | 6/2002 |

* cited by examiner

*Primary Examiner*—Wayne Young
*Assistant Examiner*—Thomas D Alunkal
(74) *Attorney, Agent, or Firm*—Renner, Otto, Boisselle & Sklar, LLP

(57) ABSTRACT

An information carrier apparatus for accessing an information carrier having at least one track formed therein includes a times crossed detection section for detecting the number of times that a head structured to access the information carrier has crossed the track; an eccentricity direction detection section for detecting an eccentricity direction of the information carrier based on the number of times; an eccentricity distance detection section for detecting an eccentricity distance of the information carrier based on the eccentricity direction and the number of times; and an eccentricity correction section for correcting eccentricity of the information carrier based on the eccentricity direction and the eccentricity distance.

11 Claims, 17 Drawing Sheets

INFORMATION CARRIER APPARATUS AND INFORMATION CARRIER ECCENTRICITY CORRECTION METHOD

This non-provisional application claims priority under 35 U.S.C., §119(a), on Patent Application No. 2003-124045 filed in Japan on Apr. 28, 2003, the entire contents of which are hereby incorporated by reference.

BACKGROUND OF THE INVENTION

1. Field of the Invention

The present invention relates to an information carrier apparatus and an information carrier eccentricity correction method for correcting eccentricity of an information carrier based on an eccentricity direction and an eccentricity distance of an information carrier.

2. Description of the Related Art

A conventional information carrier apparatus (optical disc apparatus) described in Japanese Laid-Open Publication No. 52-80802 reproduces information (signal) recorded in an information carrier (optical disc) by: irradiating the information carrier with light having a relatively small light amount and detecting the light reflected by the information carrier. The information carrier apparatus also records information on an information carrier by adjusting the light amount of an optical beam in accordance with the information to be recorded on the information carrier and writing the information on a recording material layer included in the information carrier.

Generally, a reproduction-only information carrier has information represented by pits pre-recorded formed therein in a spiral manner.

Generally, a recording material layer capable of optically recording and reproducing information is deposited on a surface of a material of the information carrier capable of recording and reproduction. In the recording material layer, a track having a spiral concaved and convexed structure is formed. The information carrier capable of recording and reproduction is produced by depositing the recording material layer on the surface of the substrate by a technique such as, for example, vapor deposition.

In order to record information on an information carrier capable of recording and reproduction, or in order to reproduce information recorded on an information carrier capable of recording and reproduction, an information carrier apparatus performs focusing control and tracking control of a light collection lens included in the information carrier apparatus. The focusing control of the light collection lens is performed in a direction normal to the surface of the information carrier (hereinafter, referred to also as the "focusing direction") such that the optical beam is always converged on the recording material layer. The tracking control of the light collection lens is performed in a radial direction of the surface of the information carrier (hereinafter, referred to also as the "tracking direction") such that the optical beam is always on a prescribed track of the information carrier.

FIG. 16 shows a structure of a conventional information carrier apparatus 500 described in Japanese Laid-Open Publication No. 2001-160226.

The information carrier apparatus (optical disc apparatus) 500 includes an optical head 10, an FE (focusing error) signal generator 20, and an Fc filter 21. The optical head 10 includes a semiconductor laser device 11, a beam splitter 12, a light collection lens 13, a focusing actuator 14, a tracking actuator 15, and a light detector 16.

An information carrier 1 is mounted on the information carrier apparatus 500.

The semiconductor laser device 11 generates an optical beam. The optical beam passes through the beam splitter 12, and is converged on the information carrier 1 by the light collection lens 13. The optical beam is then reflected by the information carrier 1, again passes through the light collection lens 13, is reflected by the beam splitter 12, and is then directed to the light detector 16.

The light collection lens 13 is supported by an elastic member (not shown). When an electric current flows through the focusing actuator 14, the light collection lens 13 moves in the focusing direction by an electromagnetic force. When an electric current flows through the tracking actuator 15, the light collection lens 13 moves in the tracking direction by an electromagnetic force.

The light detector 16 detects a light amount of the light incident thereon and sends a light amount signal representing the detected light amount to the FE signal generator 20.

The FE signal generator 20 generates an FE (focusing error) signal based on the light amount signal, and sends the FE signal to the focusing actuator 14 through the Fc filter 21. The FE signal represents the convergence state of the optical beam on the information carrier 1, more specifically, a deviation, in the focusing direction, between the focal point of the optical beam and a point on the information carrier 1 to which the optical beam is converged.

The Fc filter 21 performs phase compensation of the FE signal sent from the FE signal generator 20 in order to stably perform the focusing control of the light collection lens 13.

The focusing actuator 14 drives the light collection lens 13 in the focusing direction based on the FE signal sent from the FE signal generator 20 so as to focus the optical beam on an information face of the information carrier 1.

The information carrier apparatus 500 further includes a TKC signal generator 30, an OFTR signal generator 36, and a crossing detector 37.

The light detector 16 sends the light amount signal also to the TKC signal generator 30 and the OFTR signal generator 36.

The TKC signal generator 30 generates a signal indicating that the optical beam has crossed a certain track (hereinafter, referred to as a "TKC signal") based on the light amount signal and sends the TKC signal to the crossing detector 37.

The OFTR signal generator 36 generates a signal indicating whether or not the optical beam is directed to the track (hereinafter, referred to as an "OFTR signal") based on the light amount signal, and sends the OFTR signal to the crossing detector 37.

The crossing detector 37 detects the number of times that the optical beam has crossed the track based on the TKC signal and the OFTR signal, and generates a track crossing signal which indicates the number of times that the optical beam has crossed the track and also an eccentricity direction of the information carrier 1.

The TKC signal and the OFTR signal are offset in phase from each other by 90 degrees. Therefore, the crossing detector 37 can determine whether the optical beam is crossing the track toward an inner portion of the information carrier 1 or toward an outer portion of the information carrier 1. Accordingly, the track crossing signal generated by the crossing detector 37 includes information which indicates whether the optical beam is crossing the track toward an inner portion of the information carrier 1 or toward an outer portion of the information carrier 1, i.e., the information indicating eccentricity direction of the information carrier 1.

The information carrier apparatus 500 further includes a motor 34, an eccentricity driving generator 32, an eccentricity memory 33, and an eccentricity correction indicator 35.

The motor 34 rotates the information carrier 1 to generate a rotation phase signal which represents a rotation phase of the information carrier 1, and sends the rotation phase signal to the eccentricity driving generator 32 and the-eccentricity memory 33.

Based on the rotation phase signal, the eccentricity driving generator 32 obtains a track crossing signal sent from the crossing detector 37 for each rotation phase of the information carrier 1. The eccentricity driving generator 32 detects an eccentricity distance of the information carrier 1 corresponding to the rotation phase of the information carrier 1 based on the track crossing signal which indicates the number of times that the optical beam has crossed the track and also the eccentricity direction of the information carrier 1. The eccentricity driving generator 32 further generates a driving signal for correcting (or canceling) the eccentricity of the information carrier 1 based on the eccentricity direction and the eccentricity distance of the information carrier 1, and sends the driving signal to the eccentricity memory 33.

The eccentricity correction indicator 35 sends one of a signal indicating a state where the eccentricity is not corrected (no eccentricity correction state), a signal indicating a state where eccentricity correction is being learned (eccentricity correction learning state), and a signal indicating a state where the eccentricity is corrected (eccentricity correction state) to the eccentricity memory 33.

Only when the signal sent from the eccentricity correction indicator 35 indicates the eccentricity correction learning state, the eccentricity memory 33 obtains the driving signal sent from the eccentricity driving generator 32 and stores the driving signal in accordance with the rotation phase signal sent from the motor 34. Only when the signal sent from the eccentricity correction indicator 35 indicates the eccentricity correction state, the eccentricity memory 33 sends the driving signal stored therein to the tracking actuator 15 based on the rotation phase signal sent from the motor 34.

FIG. 17 shows a track crossing signal. In FIG. 17, the horizontal axis represents the rotation phase of the motor 34, and the vertical axis represents the number of times that the optical beam has crossed the track.

A track crossing signal is generated by the crossing detector 37 based on a TKC signal and an OFTR signal. Therefore, as shown in FIG. 17, the number of times that the optical beam has crossed the track is positive or negative based on the eccentricity direction of the information carrier 1.

The track pitch of an information carrier 1 is defined by the type of information carrier. The driving amount required by the tracking actuator 15 for moving the optical beam in the tracking direction by a prescribed distance is also defined by the type of information carrier apparatus. Accordingly, the eccentricity driving generator 32 can generate a driving signal for correcting the eccentricity of the information carrier 1 based on the track crossing signal.

While the motor 34 is performing one rotation, the eccentricity correction indicator 35 sends a signal indicating the eccentricity correction learning state to the eccentricity memory 33. Thus, the eccentricity memory 33 stores the driving signal for correcting the eccentricity of the information carrier 1 for each rotation phase of the motor 34.

Then, the eccentricity correction indicator 35 sends a signal indicating the eccentricity correction state to the eccentricity memory 33. Thus, the eccentricity memory 33 can send the driving signal for correcting the eccentricity of the information carrier 1 to the tracking actuator 15 for each rotation phase of the motor 34.

As described above with reference to FIGS. 16 and 17, the eccentricity direction is conventionally detected relying on the information recorded on the information carrier 1. For example, the TKC signal and the OFTR signal need to be detected in order to detect the eccentricity direction of the information carrier 1. In order to generate the OFTR signal, the OFTR signal generator 36 detects an amplitude of a signal representing the information recorded on the information carrier 1.

However, the information carrier 1, capable of recording information, has a portion in which no information is recorded. From such a portion, the eccentricity direction of the information carrier 1 cannot be detected. For example, an "amplitude of the signal indicating the information recorded in the information carrier 1" cannot be detected from such a portion, and therefore the OFTR signal cannot be generated. This makes it impossible to detect the eccentricity direction of the information carrier 1 based on the TKC signal and the OFTR signal.

FIG. 18 shows a track crossing signal which is generated by the crossing detector 37 when the OFTR signal cannot be detected. In FIG. 18, the horizontal axis represents the rotation phase of the motor 34, and the vertical axis represents the number of times that the optical beam has crossed the track.

Since the crossing detector 37 cannot detect the eccentricity direction of the information carrier 1, the number of times that the optical beam has crossed the track is shown to be simply increased. A driving signal for correcting eccentricity cannot be generated based on such a track crossing signal by the conventional technique.

SUMMARY OF THE INVENTION

According to one aspect of the invention, an information carrier apparatus for accessing an information carrier having at least one track formed therein, the information carrier apparatus includes a times crossed detection section for detecting the number of times that a head structured to access the information carrier has crossed the track; an eccentricity direction detection section for detecting an eccentricity direction of the information carrier based on the number of times; an eccentricity distance detection section for detecting an eccentricity distance of the information carrier based on the eccentricity direction and the number of times; and an eccentricity correction section for correcting eccentricity of the information carrier based on the eccentricity direction and the eccentricity distance.

In one embodiment of the invention, the eccentricity direction detection section includes: a ramp wave application signal generation section for generating a ramp wave application signal by applying a ramp wave signal to a times crossed relationship signal which represents the relationship between the number of times and a rotation phase of the information carrier; a differential value generation section for generating a plurality of differential values by differentiating a value represented by the ramp wave application signal with the rotation phase; and a differential value comparison section for comparing the plurality of differential values. The eccentricity direction of the information carrier is detected based on the comparison result of the plurality of differential values.

In one embodiment of the invention, the information carrier apparatus accesses the information carrier by movement of the head; and the ramp wave signal is applied to the times crossed relationship signal in accordance with the movement of the head.

In one embodiment of the invention, the differential value comparison section includes: a section for dividing a range of the rotation phase into a plurality of rotation phase ranges based on the plurality of differential values; and a section for generating a plurality of sums by calculating a sum of the differential values for each of the plurality of rotation phase ranges. The differential value comparison section compares the plurality of sums and detects the eccentricity direction of the information carrier based on the comparison result of the plurality of sums.

In one embodiment of the invention, the differential value comparison section further includes a section for inverting the polarity of the differential values corresponding to at least one of the plurality of rotation phase ranges based on the comparison result of the plurality of sums.

In one embodiment of the invention, the differential value comparison section includes a section for detecting a plurality of maximum values included in the plurality of differential values; and the differential value comparison section compares the plurality of maximum values and detects the eccentricity direction of the information carrier based on the comparison result of the plurality of maximum values.

In one embodiment of the invention, the differential value comparison section further includes: a section for dividing a range of the rotation phase into a plurality of rotation phase ranges based on the plurality of differential values; and a section for inverting the polarity of the differential values corresponding to at least one of the plurality of rotation phase ranges based on the comparison result of the plurality of maximum values.

In one embodiment of the invention, the eccentricity direction detection section includes: a section for detecting a plurality of minimum values included in the plurality of differential values; and a section for dividing a range of the rotation phase into a plurality of rotation phase ranges based on the plurality of minimum values.

In one embodiment of the invention, the eccentricity direction detection section includes: a section for detecting a plurality of maximum values included in the plurality of differential values; and a section for dividing a range of the rotation phase into a plurality of rotation phase ranges based on the plurality of maximum values.

In one embodiment of the invention, the eccentricity direction detection section includes: a cycled wave application signal generation section for generating a cycled wave application signal by applying a cycled wave signal having a certain cycle to a times crossed relationship signal which represents the relationship between the number of times and a rotation phase of the information carrier; a first differential value generation section for generating a plurality of first differential values by differentiating a value represented by the cycled wave application signal with the rotation phase; a second differential value generation section for generating a plurality of second differential values by differentiating a value represented by the cycled wave application signal with the rotation phase; and a phase comparison section for comparing a phase of a first differential value signal and a phase of a second differential value signal. The first differential value signal represents the plurality of first differential values. The second differential value signal represents the plurality of second differential values. The eccentricity direction of the information carrier is detected based on the comparison result of the phase of the first differential value signal and the phase of the second differential value signal.

In one embodiment of the invention, the cycled wave application signal generation section generates a sine wave application signal by applying a sine wave signal to the times crossed relationship signal.

In one embodiment of the invention, the information carrier apparatus accesses the information carrier by movement of the head; and the cycled wave signal is applied to the times crossed relationship signal in accordance with the movement of the head.

In one embodiment of the invention, the phase comparison section includes a section for inverting the polarity of the first differential values corresponding to at least a part of the phase of the first differential value signal, based on the comparison result of the phase of the first differential value signal and the phase of the second differential value signal. The at least the part of the phase and the phase of the second differential value signal are opposite to each other.

In one embodiment of the invention, the eccentricity direction detection section includes a cycled wave application signal generation section for generating a cycled wave application signal by applying a first cycled wave signal to a times crossed relationship signal which represents the relationship between the number of times and a rotation phase of the information carrier during a first period, and by applying a second cycled wave signal to the times crossed relationship signal during a second period which is different from the first period. The first cycled wave signal represents a first cycled wave having a certain first cycle, the second cycled wave signal represents a second cycled wave having a certain second cycle, and the first cycled wave and the second cycled wave have different waveforms from each other. The eccentricity direction detection section includes: a differential value generation section for generating a plurality of differential values by differentiating a value represented by the cycled wave application signal with a rotation phase of the information carrier, and a differential value comparison section for comparing a third differential value, among the plurality of differential values, corresponding to the cycled wave application signal generated during the first period and a fourth differential value, among the plurality of differential values, corresponding to the cycled wave application signal generated during the second period. The eccentricity direction of the information carrier is detected based on the comparison result of the third differential value and the fourth differential value.

In one embodiment of the invention, the first cycled wave signal represents a ramp wave having a first inclination, and the second cycled wave signal represents a ramp wave having a second inclination which is different from the first inclination.

In one embodiment of the invention, the first cycled wave and the second cycled wave are continuous with each other.

In one embodiment of the invention, the first cycle and the second cycle are different from a rotation cycle of the information carrier.

In one embodiment of the invention, the first cycled wave is a sine wave having a first amplitude, the second cycled wave is a sine wave having a second amplitude which is different from the first amplitude, and the first cycle and the second cycle are equal to a rotation cycle of the information carrier.

In one embodiment of the invention, the first cycled wave and the second cycled wave are continuous with each other at a zero-cross position.

In one embodiment of the invention, one of the first amplitude and the second amplitude is zero.

In one embodiment of the invention, the eccentricity direction detection section includes: an eccentricity direction estimation section for estimating the eccentricity direction; and an eccentricity direction determination section for determining whether the estimated eccentricity direction is correct or not based on a post-correction number of times. The post-correction number of times is the number of times that the head, which is structured to access the information carrier, has crossed the track after the eccentricity is corrected.

In one embodiment of the invention, when the post-correction number of times is zero, the eccentricity direction determination section determines that the estimated eccentricity direction is correct; and when the post-correction number of times is not zero, the eccentricity direction determination section determines that the estimated eccentricity direction is incorrect. When the estimated eccentricity direction is determined as being incorrect, the eccentricity direction detection section modifies the estimated eccentricity direction.

In one embodiment of the invention, the eccentricity direction detection section includes a section for generating a fifth differential value by differentiating a value represented by a pre-correction times crossed relationship signal with the rotation phase of the information carrier, and generating a sixth differential value by differentiating a value represented by a post-correction times crossed relationship signal with the rotation phase of the information carrier. The pre-correction times crossed relationship signal represents the relationship between a pre-correction number of times and the rotation phase before the eccentricity is corrected. The pre-correction number of times is the number of times that the head, which is structured to access the information carrier, has crossed the track before the eccentricity is corrected. The post-correction times crossed relationship signal represents the relationship between the post-correction number of times and the rotation phase of the information carrier. The eccentricity direction determination section determines whether the estimated eccentricity direction is correct or not by comparing the fifth differential value and the sixth differential value. When the estimated eccentricity direction is determined as being incorrect, the eccentricity direction detection section modifies the estimated eccentricity direction.

In one embodiment of the invention, the times crossed detection section includes a noise removing section for removing noise from the times crossed relationship signal which represents the relationship between the number of times and the rotation phase of the information carrier. The noise to be removed by the noise removing section has a frequency twice or more a rotation frequency of the information carrier.

In one embodiment of the invention, the eccentricity direction estimation section estimates the eccentricity direction based on the pre-correction number of times. The pre-correction number of times is the number of times that the head, which is structured to access the information carrier, has crossed the track before the eccentricity is corrected.

In one embodiment of the invention, the eccentricity correction section corrects the eccentricity before tracking control of the information carrier apparatus is transferred from an inoperative state to an operative state.

In one embodiment of the invention, the eccentricity correction section corrects the eccentricity after tracking control of the information carrier apparatus is transferred from an inoperative state to an operative state.

According to another aspect of the invention, an information carrier correction method for correcting eccentricity of an information carrier having at least one track formed therein, the information carrier correction method comprising the steps of: (a) detecting the number of times that a head, structured to access the information carrier, has crossed the track; (b) detecting an eccentricity direction of the information carrier based on the number of times; (c) detecting an eccentricity distance of the information carrier based on the eccentricity direction and the number of times; and (d) correcting eccentricity of the information carrier based on the eccentricity direction and the eccentricity distance.

In one embodiment of the invention, step (b) includes the steps of: (b1-1) generating a ramp wave application signal by applying a ramp wave signal to a times crossed relationship signal which represents the relationship between the number of times and a rotation phase of the information carrier; (b1-2) generating a plurality of differential values by differentiating a value represented by the ramp wave application signal with the rotation phase; and (b1-3) comparing the plurality of differential values. The eccentricity direction of the information carrier is detected based on the comparison result of the plurality of differential values.

In one embodiment of the invention, step (b) includes the steps of: (b2-1) generating a cycled wave application signal by applying a cycled wave signal having a certain cycle to a times crossed relationship signal which represents the relationship between the number of times and a rotation phase of the information carrier; (b2-2) generating a plurality of first differential values by differentiating a value represented by the cycled wave application signal with the rotation phase; (b2-3) generating a plurality of second differential values by differentiating a value represented by the cycled wave application signal with the rotation phase; and (b2-4) comparing a phase of a first differential value signal and a phase of a second differential value signal. The first differential value signal represents the plurality of first differential values. The second differential value signal represents the plurality of second differential values. The eccentricity direction of the information carrier is detected based on the comparison result of the phase of the first differential value signal and the phase of the second differential value signal.

In one embodiment of the invention, step (b) includes the step of: (b3-1) generating a cycled wave application signal by applying a first cycled wave signal to a times crossed relationship signal which represents the relationship between the number of times and a rotation phase of the information carrier during a first period, and by applying a second cycled wave signal to the times crossed relationship signal during a second period which is different from the first period. The first cycled wave signal represents a first cycled wave having a certain first cycle, the second cycled wave signal represents a second cycled wave having a certain second cycle, and the first cycled wave and the second cycled wave have different waveforms from each other. Step (b) further comprising the steps of: (b3-2) generating a plurality of differential values by differentiating a value represented by the cycled wave application signal with the rotation phase of the information carrier; and (b3-3) comparing a third differential value, among the plurality of differential values, corresponding to the cycled wave application signal generated during the first period and a fourth differential value, among the plurality of differential values, corresponding to the cycled wave application signal generated during the second period. The eccentricity direction of the information carrier is detected based on the comparison result of the third differential value and the fourth differential value.

In one embodiment of the invention, step (b) includes the steps of: estimating the eccentricity direction; and determining whether the estimated eccentricity direction is correct or not based on a post-correction number of times. The post-correction number of times is the number of times that the head, which is structured to access the information carrier, has crossed the track after the eccentricity is corrected.

According to the present invention, the eccentricity direction of an information carrier can be detected based on the number of times that the optical head, which is structured to access the information carrier, has crossed a certain track. The eccentricity distance of the information carrier can be detected based on such a number of times and the eccentricity direction. The eccentricity of the information can be corrected based on the eccentricity direction and the eccentricity distance.

Since the eccentricity direction of the information carrier can be detected without relying on the information recorded on the information carrier, the eccentricity of the information carrier can be corrected even when the information carrier has no information recorded thereon.

Since the eccentricity direction of the information carrier can be detected without relying on the information recorded on the information carrier, the eccentricity in the state where tracking control is inoperative can be measured even in a recording medium for which the direction in which the optical head has crossed cannot be detected.

Even when a cycled wave signal which is different from a sine wave signal is applied to a times track crossed signal, the area (range of the rotation phase) can be divided accurately. It can be accurately determined which phase includes values which should be inverted, without relying on the characteristics of the eccentricity. Since the driving speed changes constantly, it is easy to determine which phase includes values which should be inverted. Smooth driving suppresses unnecessary violation and realizes smooth amplitude switching. Even when the correction direction is inverted, it can be accurately detected that the optical head has crossed the track. The eccentricity can be accurately corrected without the correction direction being inverted.

Thus, the invention described herein makes possible the advantages of providing an information carrier apparatus and an information carrier eccentricity correction method capable of detecting an eccentricity direction of an information carrier without relying on the information recorded on the information carrier.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
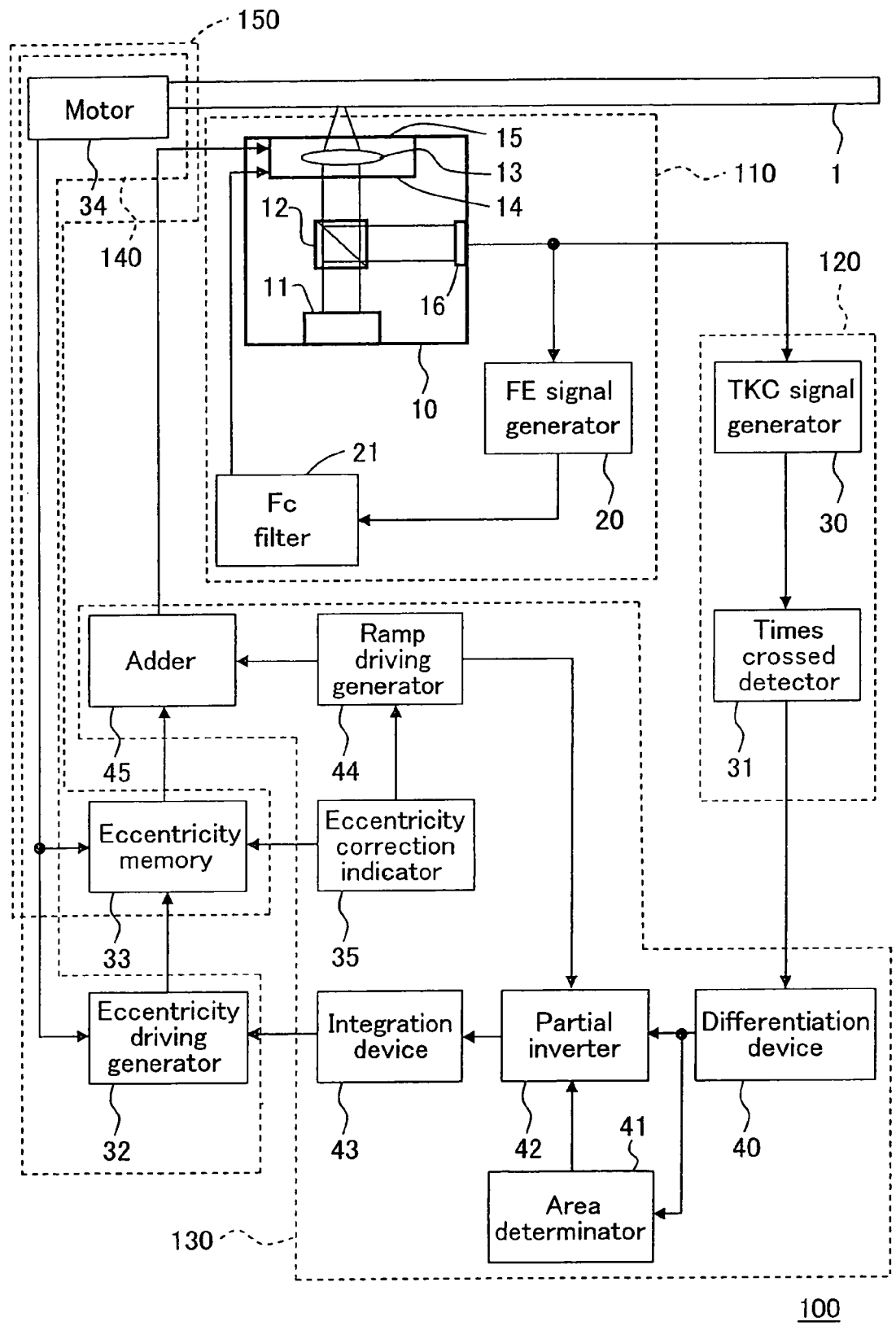
FIG. 1 shows a structure of an information carrier apparatus 100 according to a first example of the present invention.

FIG. 1 shows a structure of an information carrier apparatus 100 according to a first example of the present invention. An information carrier 1 is mounted on the information carrier apparatus (optical disc apparatus) 100. The information carrier 1 has at least one track formed therein.

The information carrier apparatus 100 includes a light amount signal detection section 110, a times crossed detection section 120, an eccentricity direction detection section 130, an eccentricity distance detection section 140, and an eccentricity correction section 150.

The light amount signal detection section 110 generates a light amount signal representing a light amount of light reflected by the information carrier 1. The light amount signal detection section 110 includes an optical head 10, an FE signal generator 20, and an Fc filter 21. The optical head 10 includes a semiconductor laser device 11, a beam splitter 12, a light collection lens 13, a focusing actuator 14, a tracking actuator 15, and a light detector 16.

The semiconductor laser device 11 generates an optical beam. The optical beam passes through the beam splitter 12, and is converged on the information carrier 1 by the light collection lens 13. The optical beam is then reflected by the information carrier 1, again passes through the light collection lens 13, is reflected by the beam splitter 12, and is then directed to the light detector 16.

The light collection lens 13 is supported by an elastic member (not shown). When an electric current flows through the focusing actuator 14, the light collection lens 13 moves in the focusing direction by an electromagnetic force. When an electric current flows through the tracking actuator 15, the light collection lens 13 moves in the tracking direction by an electromagnetic force.

The light detector 16 generates a light amount signal which represents a light amount of the light incident thereon and sends the light amount signal to the FE signal generator 20.

The FE signal generator 20 generates an FE (focusing error) signal based on the light amount signal, and sends the FE signal to the focusing actuator 14 through the Fc filter 21. The FE signal represents the convergence state of the optical beam on the information carrier 1, more specifically, a deviation, in the focusing direction, between the focal point of the optical beam and a point on the information carrier 1 to which the optical beam is converged.

The Fc filter 21 performs phase compensation of the FE signal sent from the FE signal generator 20 in order to stably perform the focusing control of the light collection lens 13.

The focusing actuator 14 drives the light collection lens 13 in the focusing direction based on the FE signal sent from the FE signal generator 20 so as to focus the optical beam on an information face of the information carrier 1.

The light detector 16 also sends the light amount signal also to the times crossed detection section 120.

The optical head 10 is structured to access the information carrier 1. The optical beam emitted by the optical head 10 is controlled to have a focal point on, for example, the information carrier 1. The times crossed detection section 120 detects the number of times that the optical head 10 has crossed the track. The times crossed detection section 120 includes a TKC signal generator 30 and a times crossed detector 31.

The TKC signal generator 30 generates a signal indicating that the optical beam has crossed the track (hereinafter, referred to as a "TKC signal") based on the light amount signal and sends the TKC signal to the times crossed detector 31.

The times crossed detector 31 detects the number of times that the optical beam has crossed the track based on the TKC signal, and generates a times track crossed signal which represents the number of times that the optical beam has crossed the track.

The eccentricity direction detection section 130 detects an eccentricity direction of the information carrier 1 based on the number of times that the optical head 10 has crossed the track. The eccentricity direction detection section 130 includes an eccentricity correction indicator 35, a ramp driving generator 44, an adder 45, a differentiation device 40, an area determinator 41, a partial inverter 42, and an integration device 43.

The eccentricity correction indicator 35 sends one of a signal indicating a state where the eccentricity is not corrected (no eccentricity correction state), a signal indicating a state where eccentricity correction is being learned (eccentricity correction learning state), and a signal indicating a state where the eccentricity is corrected (eccentricity correction state) to the eccentricity memory 33. When sending the signal indicating the eccentricity correction learning state to the eccentricity memory 33, the eccentricity correction indicator 35 sends an output permission signal to the ramp driving generator 44. The output permission signal indicates that an output of a signal is permitted. The details of the eccentricity memory 33 will be described in detail later.

The ramp driving generator 44, the adder 45 and the optical head 10 apply a ramp wave signal to a times crossed relationship signal, which indicates the relationship between the number of times the optical beam has crossed the track and the rotation phase of the information carrier 1. Thus, the ramp driving generator 44, the adder 45 and the optical head 10 generate a ramp wave application signal. For example, the ramp wave signal is applied to the times crossed relationship signal in accordance with the movement of the optical head 10. Only while the output permission signal is being sent from the eccentricity correction indicator 35, the ramp driving generator 44 sends the ramp wave signal to the tracking actuator 15 via the adder 45. The ramp wave signal has a certain inclination. The ramp driving generator 44 sends an inclination signal to the partial inverter 42. The inclination signal represents the inclination of the ramp wave signal to be output.

The differentiation device 40 differentiates a value represented by the ramp wave application signal with the rotation phase of the information carrier 1, to generate a plurality of differential values. For example, the differentiation device 40 differentiates a value represented by the ramp wave application signal sent from the times crossed detector 31 with the rotation phase of the information carrier 1, to generate a differential value signal representing a plurality of differential values. Then, the differentiation device 40 sends the differential value signal to the area determinator 41 and the partial inverter 42.

The area determinator 41 and the partial inverter 42 compares the plurality of values of the differential signal sent from the differentiation device 40. Hereinafter, the area determinator 41 and the partial inverter 42 will be described in detail.

The area determinator 41 detects a plurality of minimum values included in the differential signal (representing the plurality of differential values), and divides the range of the rotation phase of the information carrier 1 into a plurality of rotation phase ranges based on the plurality of minimum values.

In this case, the partial inverter 42 detects a plurality of maximum values included in the plurality of differential values. Based on the comparison results of the plurality of maximum values, the partial inverter 42 inverts the polarity of the differential values (positive to negative or negative to positive) corresponding to at least one of the plurality of rotation phase ranges.

For example, the area determinator 41 selects two points at which the value of the differential signal sent from the differentiation device 40 are minimum, and divides the rotation phase area (range) into area A (range A) and area B (range B) based on the rotation phase of the information carrier 1 (or the rotation phase of motor 34) respectively corresponding to the selected two points. The area determinator 41 then sends a signal representing the differential values corresponding to area A or a signal representing the differential values corresponding to area B to the partial inverter 42, in accordance with the rotation phase of the information carrier 1.

When the value represented by the inclination signal sent from the ramp driving generator 44 is positive, the partial inverter 42 compares the maximum value of the differential values corresponding to area A and the maximum value of the differential values corresponding to area B, and inverts the polarity of the differential values corresponding to the area having the larger maximum value. Then, the partial inverter 42 sends the inverted values to the integration device 43. When the value represented by the inclination signal sent from the ramp driving generator 44 is negative, the partial inverter 42 compares the maximum value of the differential values corresponding to area A and the maximum value of the differential values corresponding to area B, and inverts the polarity of the differential values corresponding to the area having the smaller maximum value. Then, the partial inverter 42 sends the inverted values to the integration device 43.

The value detected by the area determinator 41 for dividing the range of the rotation phase of the information carrier 1 into a plurality of rotation phase ranges is not limited to a plurality of minimum values. The area determinator 41 may detect a plurality of maximum values included in the differential signal and divide the range of the rotation phase of the information carrier 1 into a plurality of rotation phase ranges based on the plurality of maximum values.

The values compared by the partial inverter 42 for inverting the polarity of the differential values corresponding to at least one of the plurality of rotation phase ranges are not limited to a plurality of maximum values. The partial inverter 42 may obtain a sum of the differential values for each of the plurality of rotation phase ranges, and invert the polarity of the differential values corresponding to at least one of the plurality of rotation phase ranges based on the comparison result.

The integration device 43 integrates the value represented by the signal sent from the partial inverter 42 with the rotation phase of the information carrier 1, to generate a plurality of integral values. The integration device 43 then sends a signal indicating the plurality of integral values to an eccentricity driving generator 32.

The eccentricity distance detection section 140 detects an eccentricity distance of the information carrier 1 based on the number of times that the optical head 10 has crossed the track and the eccentricity direction of the information carrier 1. The eccentricity distance detection section 140 includes the eccentricity driving generator 32 and the motor 34.

The motor 34 rotates the information carrier 1 to generate a rotation phase signal which represents a rotation phase of the information carrier 1, and sends the rotation phase signal to the eccentricity driving generator 32.

Based on the rotation phase signal, the eccentricity driving generator 32 obtains a track crossing signal sent from the eccentricity direction detection section 130 for each rotation phase of the information carrier 1. Based on the track crossing signal, the eccentricity driving generator 32 detects the eccentricity direction and the eccentricity distance of the information carrier 1 corresponding to the rotation phase of the information carrier 1. The eccentricity driving generator 32 further generates a driving signal for correcting (or canceling) the eccentricity of the information carrier 1 based on the eccentricity direction and the eccentricity distance of the information carrier 1, and sends the driving signal to the eccentricity memory 33.

The eccentricity correction section 150 corrects the eccentricity of the information carrier 1 based on the eccentricity direction and the eccentricity distance of the information carrier 1. The eccentricity correction section 150 includes the eccentricity memory 33 and the motor 34.

The motor 34 rotates the information carrier 1 to generate a rotation phase signal, as described above, which represents a rotation phase of the information carrier 1, and sends the rotation phase signal to the eccentricity memory 33.

Only when the signal sent from the eccentricity correction indicator 35 indicates the eccentricity correction learning state, the eccentricity memory 33 obtains the driving signal sent from the eccentricity driving generator 32 and stores the driving signal in accordance with the rotation phase signal sent from the motor 34. Only when the signal sent from the eccentricity correction indicator 35 indicates the eccentricity correction state, the eccentricity memory 33 sends the driving signal stored therein to the tracking actuator 15 in accordance with the rotation phase signal sent from the motor 34.

Figure 2:
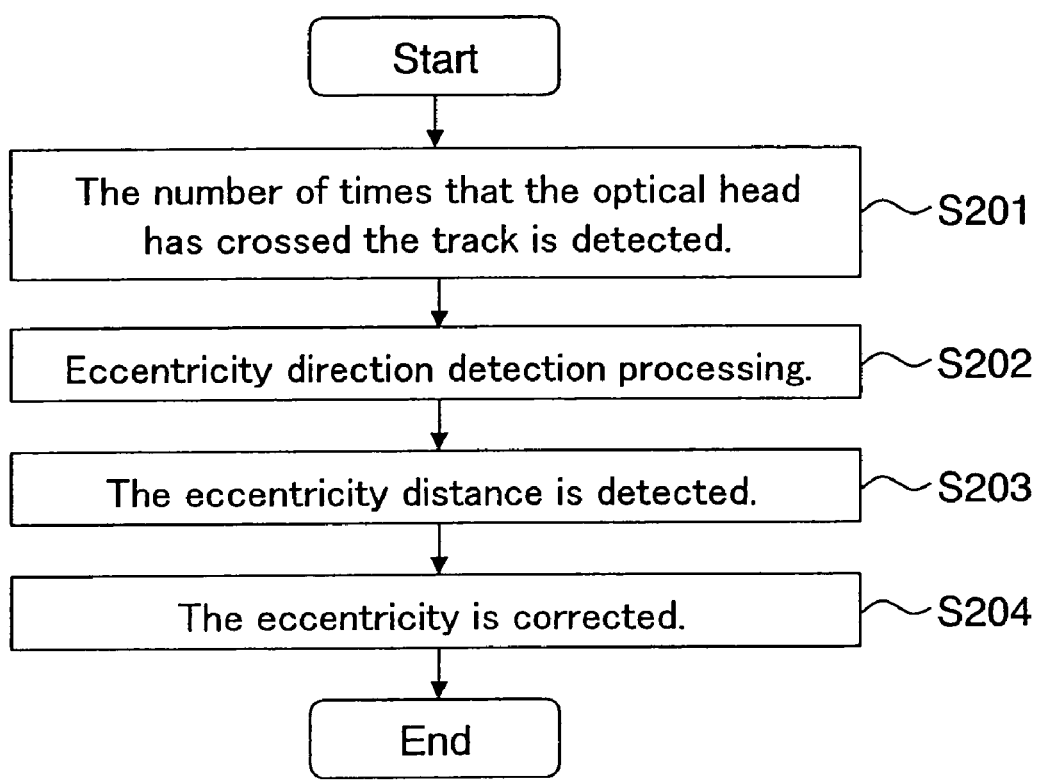
FIG. 2 is a flowchart illustrating information carrier eccentricity correction processing performed using the information carrier apparatus 100.

FIG. 2 shows a flow of information carrier eccentricity correction processing performed using the information carrier apparatus 100.

Hereinafter, the flow of information carrier eccentricity correction processing will be described step by step.

Step S201: The times crossed detection section 120 detects the number of times that the optical head 10 has crossed the track. For example, the times crossed detection section 120 detects the number of times that the optical head 10 has crossed the track based on the TKC signal and generates a times track crossed signal indicating the number of times that the optical beam has crossed the track.

The times crossed detection section 120 sends the times track crossed signal to the eccentricity direction detection section 130.

Step S202: Based on the times track crossed signal, the eccentricity direction detection section 130 performs eccentricity direction detection processing, i.e., detects the eccentricity direction of the information carrier 1 based on the number of times that the optical beam has crossed the track indicated by the times track crossed signal. The eccentricity direction detection processing performed in step S202 will be described in detail later.

Step S203: The eccentricity distance detection section 140 detects the eccentricity distance of the information carrier 1 based on the number of times that the optical beam has crossed the track and the eccentricity direction.

The track pitch of an information carrier 1 is defined by the type of information carrier. The driving amount required by the tracking actuator 15 for moving the optical beam in the tracking direction by a prescribed distance is also defined by the type of information carrier apparatus. Accordingly, the eccentricity driving generator 32 detects the eccentricity distance of the information carrier 1 based on the times track crossed signal sent from the times crossed detection section 120.

Step S204: The eccentricity correction section 150 corrects the eccentricity of the information carrier 1 based on the eccentricity direction and the eccentricity distance. For example, while the motor 34 is performing one rotation, the eccentricity correction indicator 35 sends a signal indicating the eccentricity correction learning state to the eccentricity memory 33. Thus, the eccentricity memory 33 stores the driving signal for correcting the eccentricity of the information carrier 1 for each rotation phase of the motor 34. Then, when the eccentricity correction indicator 35 sends a signal indicating the eccentricity correction state to the eccentricity memory 33, the eccentricity memory 33 can send the driving signal for correcting the eccentricity of the information carrier 1 to the tracking actuator 15 for each rotation phase of the motor 34.

Figure 3:
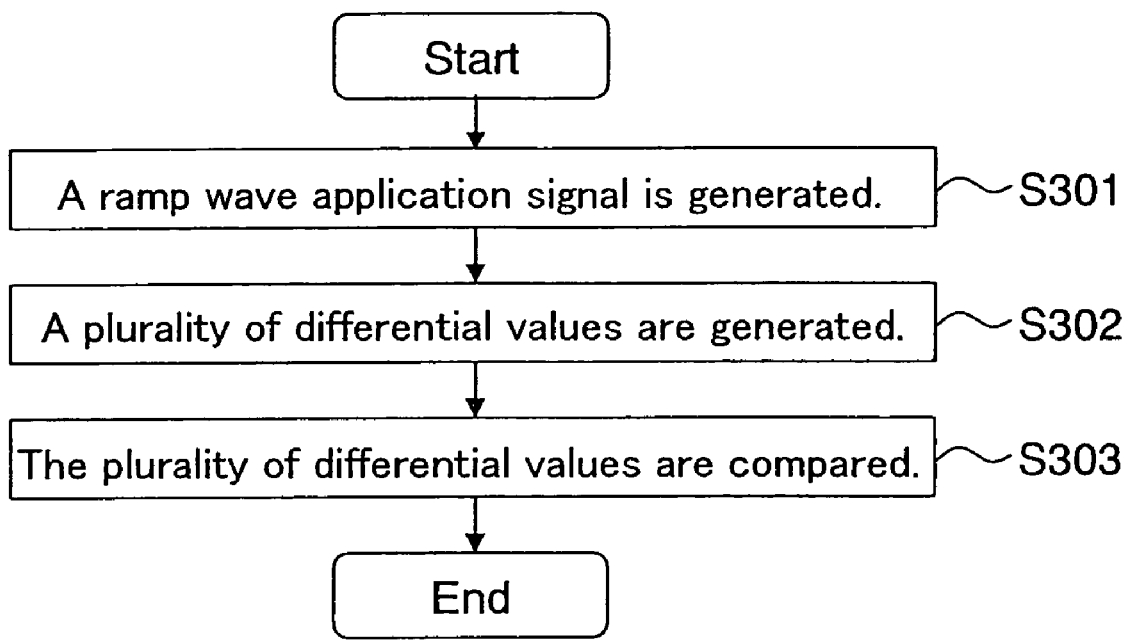
FIG. 3 is a flowchart illustrating eccentricity direction detection processing performed using the information carrier apparatus 100.
Figure 4:
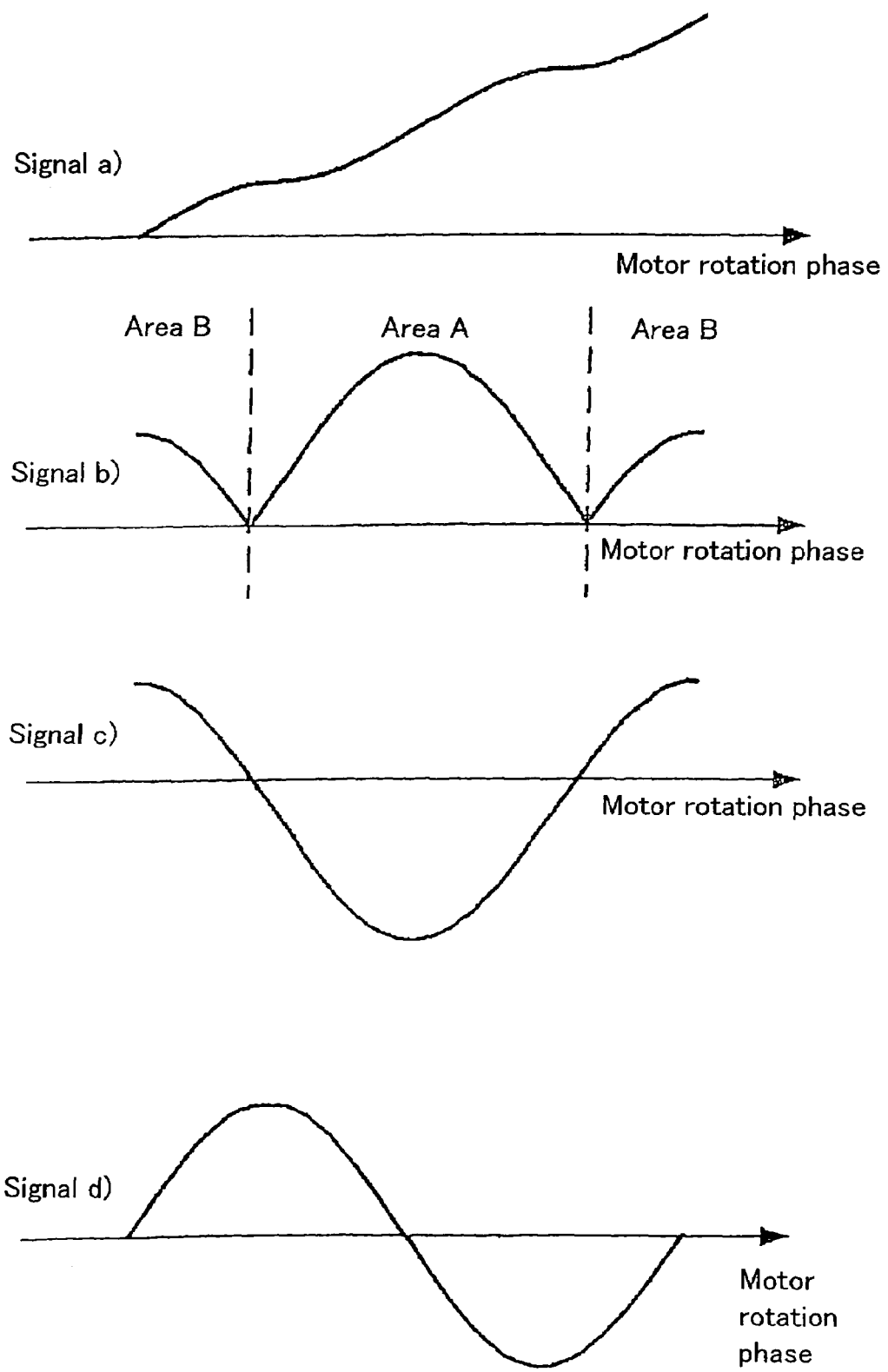
FIG. 4 shows signals processed during the eccentricity direction detection processing shown in FIG. 3.

FIG. 3 shows a flow of eccentricity direction detection processing, and FIG. 4 shows signals processed during the eccentricity direction detection processing. In FIG. 4, the horizontal axis represents the rotation phase of the motor 34, and the vertical axis represents the amplitude of the signals. In FIG. 4, signal a shows a signal to be input to the differentiation device 40. Signal b shows a signal output from the differentiation device 40. Signal c shows a signal output from the partial inverter 42. Signal d shows a signal output from the integration device 43.

Hereinafter, with reference to FIGS. 3 and 4, the eccentricity direction detection processing will be described step by step.

Step S301: The eccentricity direction detection section 130 applies a ramp wave signal to a times crossed relationship signal indicating the relationship between the number of times the optical beam has crossed the track and the rotation phase of the information carrier 1. Thus, a ramp wave application signal is generated.

For example, while the motor 34 (or the information carrier 1) is performing one rotation, the eccentricity correction indicator 35 sends a signal indicating the eccentricity correction learning state to the eccentricity memory 33. At the same time, the eccentricity correction indicator 35 sends an output permission signal to the ramp driving generator 44. The ramp driving generator 44 sends a ramp wave signal having a positive inclination to the adder 45. The ramp driving generator 44 sends a signal having a positive value corresponding to the ramp wave signal to the partial inverter 42. The ramp driving generator 44 applies a signal, for driving the tracking actuator 15, to the tracking actuator 15 via the adder 45. As a result, the times crossed detection section 120 outputs signal a (ramp wave application signal) as shown in FIG. 4.

Step S302: The eccentricity direction detection section 130 differentiates the value indicated by the ramp wave application signal with the rotation phase of the information carrier 1 to generate a plurality of differential values. This is performed by, for example, the differentiation device 40. As a result, the differentiation device 40 outputs signal b (FIG. 4). Since the times crossed detection section 120 cannot detect the eccentricity direction of the information carrier 1, the value of signal b is entirely positive.

Step S303: The eccentricity direction detection section 130 compares the plurality of differential values.

For example, the area determinator 41 selects two points at which the value of the differential signal sent from the differentiation device 40 are minimum, and divides the rotation phase area (range) into area A (range A) and area B (range B) based on the rotation phase of the information carrier 1 (or the rotation phase of motor 34) respectively corresponding to the selected two points. The area determinator 41 then sends a signal representing the differential value corresponding to area A or a signal representing the differential value corresponding to area B to the partial inverter 42, in accordance with the rotation phase of the information carrier 1. Since the inclination of the ramp wave signal is positive, the differential value indicating a positive value of track crossing amount of the optical beam is smaller than the differential value indicating a negative value of crossing amount. The "track crossing amount of the optical beam" is an amount by which the track to which the optical beam is currently converged is deviated from the track to which the optical beam should be converged. When the optical beam is converged to a track which is outer to the track to which the optical beam should be converged, the crossing amount has a positive value. When the optical beam is converged to a track which is inner to the track to which the optical beam should be converged, the crossing amount has a negative value.

When the value represented by the inclination signal sent from the ramp driving generator 44 is positive, the partial inverter 42 compares the maximum value of the diffferential values corresponding to area A and the maximum value of the differential values corresponding to area B, and inverts the polarity of the differential values corresponding to the area having the larger maximum value. Then, the partial inverter 42 sends the inverted values to the integration device 43. As a result, signal c is input to the integration section 43 (FIG. 4).

The integrator 43 generates signal d including direction information by an integration operation and sends signal d to the eccentricity driving generator 32 (FIG. 4). Based on signal d, the eccentricity driving generator 32 generates a driving signal for correcting the eccentricity of the information carrier 1.

As described above with reference to FIGS. 1 through 4, the direction in which the optical beam crosses the track is determined by applying a ramp wave signal having a certain inclination to the tracking actuator 15, utilizing an offset component occurring in the track crossing signal. Accordingly, in the eccentricity correction learning state, the eccentricity direction of the information carrier 1 can be accurately detected, and a driving signal for correcting the eccentricity of the information carrier 1 can be generated without relying on the OFTR signal.

According to the present invention, the eccentricity direction of an information carrier can be detected based on the number of times that the optical head, which is structured to access the information carrier, has crossed the track. The eccentricity distance of the information carrier can be detected based on the number of times that the optical head has crossed the track and the eccentricity direction. The eccentricity of the information carrier is corrected based on the eccentricity direction and the eccentricity distance.

Since the eccentricity direction of the information carrier can be detected without relying on the information recorded on the information carrier, the eccentricity of the information carrier can be corrected even when the information carrier has no information recorded thereon.

In the first example of the present invention, a track crossing signal corresponding to one rotation of the information carrier 1 is described. In order to detect the track crossing signal more stably, a track crossing signal corresponding to a plurality of rotations of the information carrier 1 may be detected so that the track crossing signal can be averaged for each rotation phase of the motor 34.

In the example shown in FIG. 1, the TCK signal generator 30 and the times crossing detector 31 act as "a times crossed detection section for detecting the number of times that a head structured to access the information carrier has crossed the track". The eccentricity correction indicator 35, the ramp driving generator 44, the adder 45, the differential device 40, the area determinator 41, the partial inverter 42 and the integration device 43 act as "an eccentricity direction detection section for detecting an eccentricity direction of the information carrier based on the number of times". The eccentricity driving generator 32 and the motor 34 act as "an eccentricity distance detection section for detecting an eccentricity distance of the information carrier based on the eccentricity direction and the number of times". The eccentricity memory 33 and the motor 34 act as "an eccentricity correction section for correcting eccentricity of the information carrier based on the eccentricity direction and the eccentricity distance". However, the elements included in the information carrier apparatus according to the present invention are not limited to those shown in FIG. 1.

The information carrier apparatus according to the present invention may have any structure as long as elements therein act as "a times crossed detection section for detecting the number of times that a head structured to access the information carrier has crossed the track"; "an eccentricity direction detection section for detecting an eccentricity direction of the information carrier based on the number of times"; "an eccentricity distance detection section for detecting an eccentricity distance of the information carrier based on the eccentricity direction and the number of times"; and "an eccentricity correction section for correcting eccentricity of the information carrier based on the eccentricity direction and the eccentricity distance".

EXAMPLE 2

Figure 5:
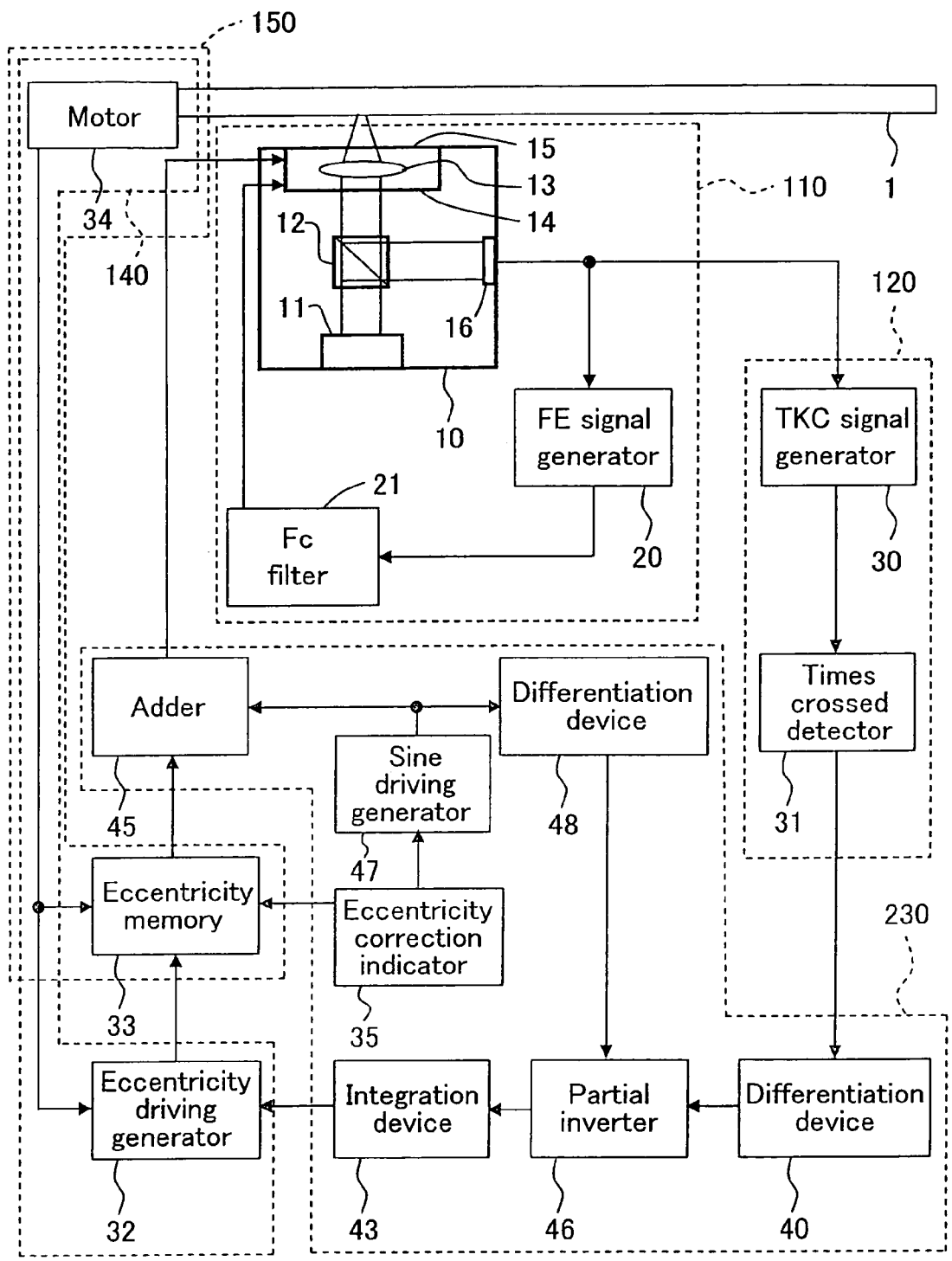
FIG. 5 shows a structure of an information carrier apparatus 200 according to a second example of the present invention.

FIG. 5 shows a structure of an information carrier apparatus 200 according to a second example of the present invention. Elements identical to those of the information carrier apparatus 100 shown in FIG. 1 will bear identical reference numerals thereto and will not be described in detail.

An eccentricity direction detection section 230 detects an eccentricity direction of the information carrier 1 based on the number of times that an optical head 10, structured to access the information carrier 1, has crossed the track. The eccentricity direction detection section 230 includes an eccentricity correction indicator 35, a sine driving generator 47, an adder 45, a differentiation device 48, a differentiation device 40, a partial inverter 46, and an integration device 43.

The eccentricity correction indicator 35 sends one of a signal indicating a no eccentricity correction state, a signal indicating an eccentricity correction learning state, and a signal indicating an eccentricity correction state to the eccentricity memory 33. When sending the signal indicating the eccentricity correction learning state to the eccentricity memory 33, the eccentricity correction indicator 35 sends an output permission signal to the sine driving generator 47.

The sine driving generator 47, the adder 45 and the optical head 10 apply a cycled wave signal having a certain cycle to a times crossed relationship signal which indicates the relationship between the number of times the optical beam has crossed the track and the rotation phase of the information carrier 1. Thus, the sine driving generator 47, the adder 45 and the optical head 10 generate a cycled wave application signal. For example, the cycled wave signal is applied to the times crossed relationship signal in accordance with the movement of the optical head 10. The cycled wave signal is, for example, a sine wave signal. Only while the output permission signal is being sent from the eccentricity correction indicator 35, the sine driving generator 47 sends the sine wave signal having a certain amplitude and a certain cycle to the tracking actuator 15 via the adder 45. Only while the output permission signal is being sent from the eccentricity correction indicator 35, the sine driving generator 47 sends the sine wave signal having a certain amplitude and, a certain cycle to the differentiation device 48.

The differentiation device 48 differentiates a value indicated by the cycled wave signal with the rotation phase of the information carrier 1, to generate a second differential value signal. The second differential value signal represents a plurality of second differential values. For example, the differentiation device 48 differentiates a value indicated by the sine wave signal sent from the sine driving generator. 47 with the rotation phase of the information carrier 1, to generate a differential value signal, and sends the differential value signal to the partial inverter 46.

The differentiation device 40 differentiates a value represented by the cycled wave application signal with the rotation phase of the information carrier 1, to generate a first differential value signal. The first differential value signal represents a plurality of differential values. For example, the differentiation device 40 differentiates the value represented by the cycled wave application signal (track crossing signal) sent from the times crossed detector 31 with the rotation phase of the information carrier 1, to generate a differential value signal. Then, the differentiation device 40 sends the differential value signal to the partial inverter 46.

The partial inverter 46 compares the phase of the first differential value signal and the phase of the second differential value signal. Based on the comparison result, the partial inverter 46 inverts the polarity of the first differential value corresponding to at least a part of the phase of the first differential value signal. The at least the part of the phase and the phase of the second differential value signal are opposite to each other.

For example, the partial inverter 46 performs synchronous detection using the phase of the signal sent from the differentiation section 40 and the phase of the signal sent from the differentiation section 48. Only when a part of the phase of the signal sent from the differentiation section 40 is opposite to the phase of the signal sent from the differentiation section 48, the partial inverter 46 inverts the polarity of the partial phase. The partial inverter 46 also passes the signal sent from the differentiation section 40, including the inverted signal, through a low pass filter (not shown) and sends the resultant signal to the integration device 43. The low pass filter does not pass the sine wave signal sent from the sine driving generator 47.

The integration device 43 integrates a value represented by the signal sent from the partial inverter 46 with the rotation phase of the information carrier 1, to generate a plurality of integral values. The integration device 43 sends a signal representing the plurality of integral values to the eccentricity driving generator 32.

Information carrier eccentricity correction processing performed using the information carrier apparatus 200 according to the second example of the present invention is substantially the same as the processing performed using the information carrier apparatus 100 except for the eccentricity direction detection processing performed using the eccentricity direction detection section 230, and therefore will not be described except for the eccentricity direction detection processing.

Figure 6:
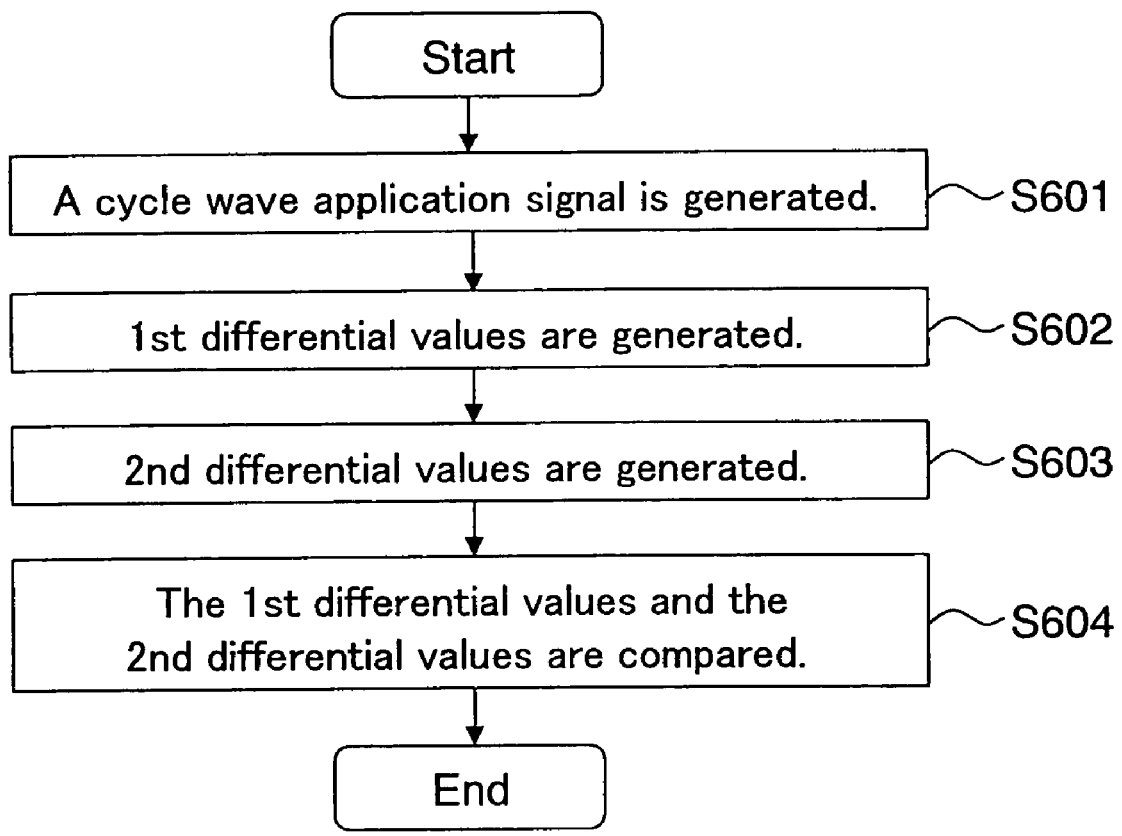
FIG. 6 is a flowchart illustrating eccentricity direction detection processing performed using an eccentricity direction detection section 230 included in the information carrier apparatus 200.
Figure 7:
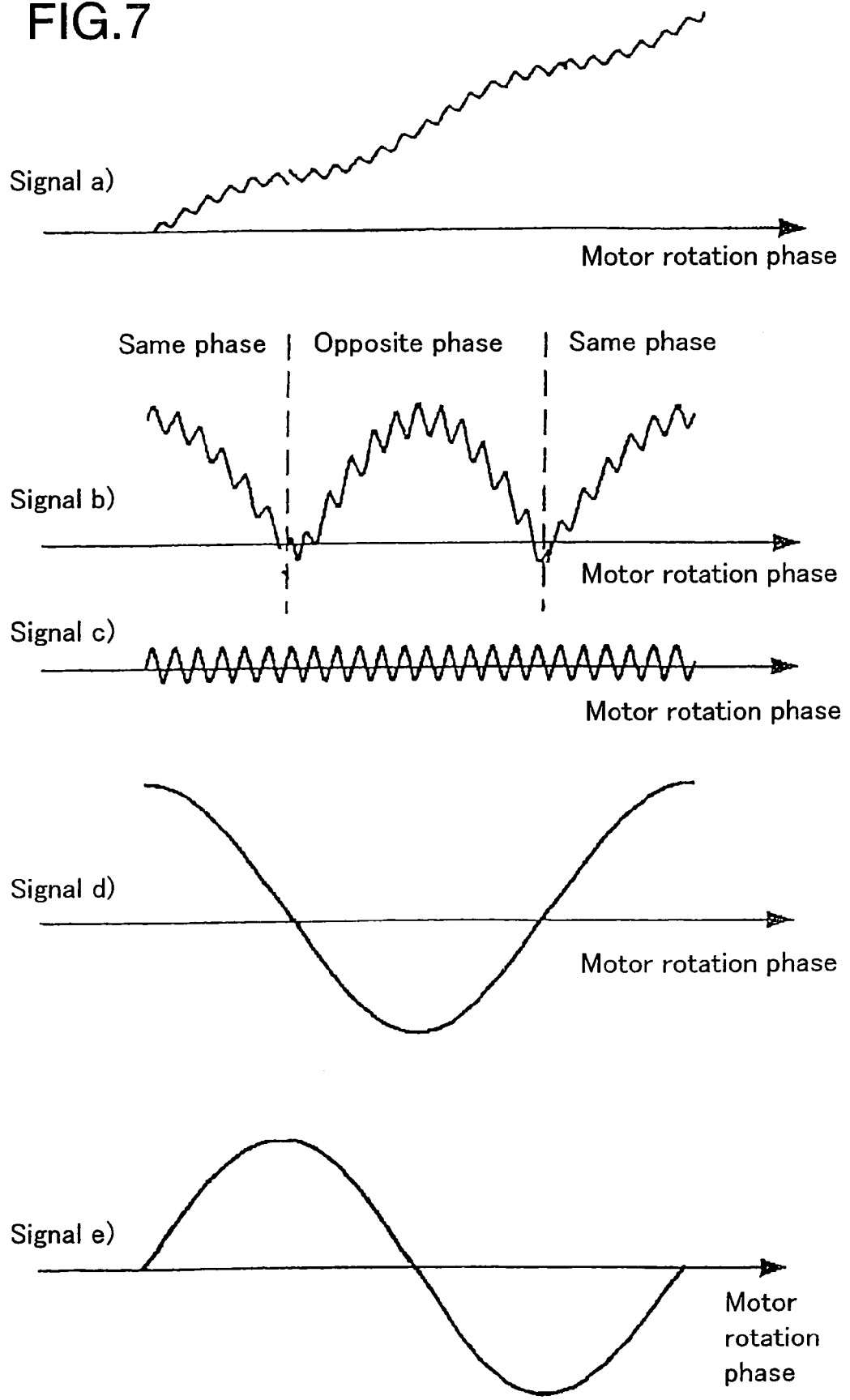
FIG. 7 shows signals processed during the eccentricity direction detection processing shown in FIG. 6.

FIG. 6 shows a flow of eccentricity direction detection processing performed by using the eccentricity direction detection section 230, and FIG. 7 shows signals processed during the eccentricity direction detection processing shown in FIG. 6. In FIG. 7, the horizontal axis represents the rotation phase of the motor 34, and the vertical axis represents the amplitude of the signals. In FIG. 7, signal a shows a signal to be input to the differentiation device 40. Signal b shows a signal output from the differentiation device 40. Signal c shows a signal output from the differentiation device 48. Signal d shows a signal output from the partial inverter 46. Signal e shows a signal output from the integration device 43.

Hereinafter, with reference to FIGS. 6 and 7, the eccentricity direction detection processing performed using the eccentricity direction detection section 230 will be described step by step.

Step S601: The eccentricity direction detection section 230 applies a cycled wave signal to a times crossed relationship signal indicating the relationship between the number of times the optical beam has crossed the track and the rotation phase of the information carrier 1. Thus, a cycled wave application signal is generated.

For example, while the motor 34 (or the information carrier 1) is performing one rotation, the eccentricity correction indicator 35 sends a signal indicating the eccentricity correction learning state to the eccentricity memory 33. At the same time, the eccentricity correction indicator 35 sends an output permission signal to the sine driving generator 47. The sine driving generator 47 sends a sine wave signal having a certain amplitude and a certain cycle to the adder 45 and the differentiation device 48. The sine driving generator 47 applies a signal for driving the tracking actuator 15 to the tracking actuator 15 via the adder 45. As a result, the times crossed detection section 120 outputs signal a as shown in FIG. 7.

Step S602: The eccentricity direction detection section 230 differentiates the value indicated by the cycled wave application signal with the rotation phase of the information carrier 1 to generate a plurality of first differential values. This is performed by, for example, the differentiation device 40 by differentiating a value represented by signal a sent from the times crossed detection section 120 with the rotation phase of the information carrier 1. As a result, the differentiation device 40 outputs signal b (FIG. 7). Since the times crossed detection section 120 cannot detect the eccentricity direction of the information carrier 1, the value of signal b is entirely positive.

Step S603: The eccentricity direction detection section 230 differentiates the value represented by the cycled wave signal with the rotation phase of the information carrier 1, to generate a plurality of second differential values. For example, the differentiation device 48 differentiates a value indicated by the signal sent from the sine driving generator 47 with the rotation phase of the information carrier 1, to generate a plurality of differential values. As a result, the differentiation device 48 outputs signal c (FIG. 7).

Step S304: The eccentricity direction detection section 230 compares the phase of the first differential value signal and the phase of the second differential value signal.

For example, the signal sent from the differentiation device 40 is influenced by the signal sent from the sine driving generator 47. Comparing the signal sent from the differentiation device 40 and the signal sent from the differentiation device 48, a part of the phase of the signal sent from the differentiation device 40 may sometimes be opposite to the phase of the signal sent from the differentiation device 48. Although a sine wave signal having a certain amplitude is sent from the sine driving generator 47, the amplitude of the signal is very small. Therefore, the influence of the eccentricity dominates the track crossing signal. The sine wave signal sent from the sine driving generator 47 merely increases or decreases the eccentricity speed slightly. Accordingly, when the eccentricity speed is negative, the influence of the sine wave signal sent from the sine driving generator 47 appears in the signal sent from the differentiation device 40.

For example, the partial inverter 46 performs synchronous detection using the phase of the signal sent from the differentiation section 40 and the phase of the signal sent from the differentiation section 48. Only when a part of the phase of the signal sent from the differentiation 1o section 40 is opposite to the phase of the signal sent from the differentiation section 48, the partial inverter 46 inverts the polarity of the part of the phase. The partial inverter 46 also passes the signal sent from the differentiation section 40, including the inverted signal, through a low pass filter (not shown), and thus signal d is generated (FIG. 7). Signal d is sent to the integration device 43. The low pass filter does not pass the sine wave signal sent from the sine driving generator 47.

The integration device 43 generates signal e including direction information by an integration operation and sends signal e to the eccentricity driving generator 32 (FIG. 7). Based on signal e including the direction information, the eccentricity driving generator 32 generates a driving signal for correcting the eccentricity of the information carrier 1.

As described above with reference to FIGS. 5 through 7, by applying a sine wave signal to the tracking actuator 15, a sine wave having an opposite phase to that of the sine wave signal applied is detected from the track crossing signal. Based on the detected sine wave having the opposite phase, the direction in which the optical beam has crossed the track is determined. Accordingly, in the eccentricity correction learning state, the eccentricity direction of the information carrier 1 can be accurately detected, and a driving signal for correcting the eccentricity of the information carrier 1 can be generated without relying on the OFTR signal.

According to the present invention, the eccentricity direction of an information carrier can be detected based on the number of times that the optical head, which is structured to access the information carrier, has crossed the track. The eccentricity distance of the information carrier can be detected based on the number of times that the optical head has crossed the track and the eccentricity direction. The eccentricity of the information carrier is corrected based on the eccentricity direction and the eccentricity distance.

Since the eccentricity direction of the information carrier can be detected without relying on the information recorded on the information carrier, the eccentricity of the information carrier can be corrected even when the information carrier has no information recorded thereon.

In the second example of the present invention, a sine wave signal is applied to the tracking actuator 15, but the signal to be applied is not limited to a sine wave signal as long as the signal is cyclic. A triangular signal may be used. In order to detect the track crossing signal more stably, a track crossing signal corresponding to a plurality of rotations of the information carrier 1 may be detected so that the track crossing signal can be averaged for each rotation phase of the motor 34.

In the example shown in FIG. 6, the TKC signal generator 30 and the times crossed detector 31 act as "a times crossed detection section for detecting the number of times that a head structured to access the information carrier has crossed the track". The eccentricity correction indicator 35, the sine driving generator 47, the adder 45, the differentiation device 40, the differentiation device 48, the partial inverter 42, and the integration device 43 act as "an eccentricity direction detection section for detecting an eccentricity direction of the information carrier based on the number of times". The eccentricity driving generator 32 and the motor 34 act as "an eccentricity distance detection section for detecting an eccentricity distance of the information carrier based on the eccentricity direction and the number of times". The eccentricity memory 33 and the motor 34 act as "an eccentricity correction section for correcting eccentricity of the information carrier based on the eccentricity direction and the eccentricity distance". However, the elements included in the information carrier apparatus according to the present invention are not limited to those shown in FIG. 6.

The information carrier apparatus according to the present invention may have any structure as long as elements therein act as "a times crossed detection section for detecting the number of times that a head structured to access the information carrier has crossed the track"; "an eccentricity direction detection section for detecting an eccentricity direction of the information carrier based on the number of times"; "an eccentricity distance detection section for detecting an eccentricity distance of the information carrier based on the eccentricity direction and the number of times"; and "an eccentricity correction section for correcting eccentricity of the information carrier based on the eccentricity direction and the eccentricity distance".

EXAMPLE 3

Figure 8:
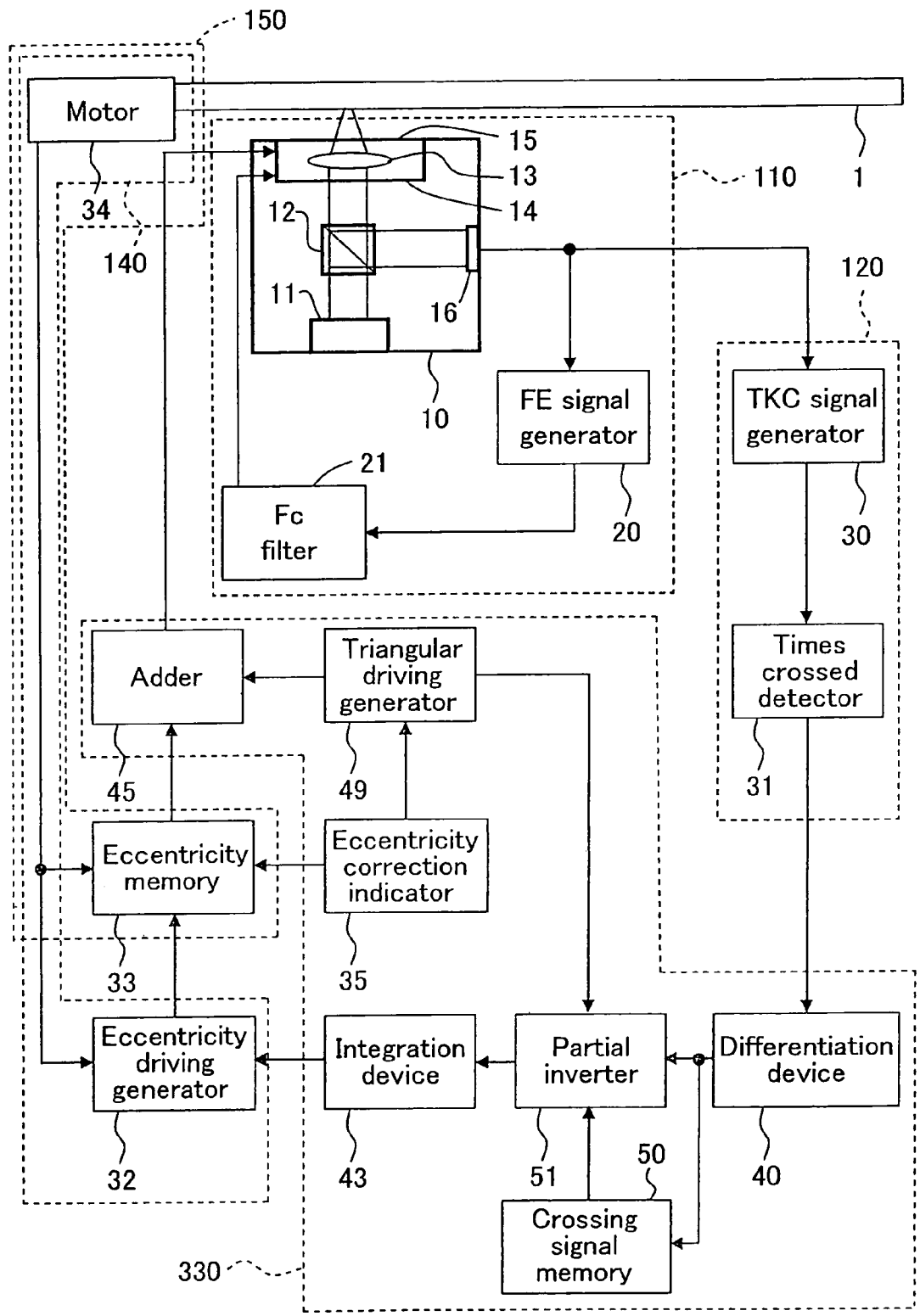
FIG. 8 shows a structure of an information carrier apparatus 300 according to a third example of the present invention.

FIG. 8 shows a structure of an information carrier apparatus 300 according to a third example of the present invention. Elements identical to those of the information carrier apparatus 100 shown in FIG. 1 will bear identical reference numerals thereto and will not be described in detail.

An eccentricity direction detection section 330 detects an eccentricity direction of the information carrier 1 based on the number of times that an optical head 10, structured to access the information carrier 1, has crossed the track. The eccentricity direction detection section 330 includes an eccentricity correction indicator 35, a triangular driving generator 49, an adder 45, a crossing signal memory 50, a differentiation device 40, a partial inverter 51, and an integration device 43.

The eccentricity correction indicator 35 sends one of a signal indicating a no eccentricity correction state, a signal indicating an eccentricity correction learning state, and a signal indicating an eccentricity correction state to the eccentricity memory 33. When sending the signal indicating the eccentricity correction learning state to the eccentricity memory 33, the eccentricity correction indicator 35 sends an output permission signal to the triangular driving generator 49.

The triangular driving generator 49, the adder 45 and the optical head 10 apply a first cycled wave signal to a times crossed relationship signal which indicates the relationship between the number of times the optical beam has crossed the track and the rotation phase of the information carrier 1 during a first period (during a first rotation phase of the motor 34), and apply a second cycled wave signal to the times crossed relationship signal during a second period (during a second rotation phase of the motor 34). Thus, the triangular driving generator 49, the adder 45 and the optical head 10 generate a cycled wave application signal. The first period is different from the second period. The first cycled wave signal represents a first cycled wave having a certain first cycle, and the second cycled wave signal represents a second cycled wave having a certain second cycle. The first cycled wave and the second cycled wave have different waveforms from each other.

For example, the cycled wave signal is applied to the times crossed relationship signal in accordance with the movement of the optical head 10. The first cycled wave signal shows a ramp wave having a first inclination, and the second cycled wave signal shows a ramp wave having a second inclination which is different from the first inclination. Only while the output permission signal is being sent from the eccentricity correction indicator 35, the triangular driving generator 49 sends the ramp signal to the tracking actuator 15 via the adder 45. The ramp signal to be sent to the tracking actuator 15 has the inclination switched for each rotation of the motor 34. The triangular driving generator 49 sends an inclination change signal to the partial inverter 51. The inclination change signal represents a change of the inclination of the ramp signal to be sent between the inclination during the current rotation and the inclination during the previous rotation.

The differentiation device 40 differentiates a value represented by the cycled wave application signal with the rotation phase of the information carrier 1, to generate a plurality of differential values. For example, the differentiation device 40 differentiates the value represented by the cycled wave application signal (track crossing signal) sent from the times crossed detector 31 with the rotation phase of the information carrier 1, to generate a plurality of differential values. Then, the differentiation device 40 sends a signal representing these differential values to the partial inverter 51 and the crossing signal memory 50.

The crossing signal memory 50 stores the signal sent from the differentiation device 40 during one rotation of the motor 34, and sends a signal, which corresponds to the immediately previous rotation of the motor 34 and is sent from the differentiation device 40, to the partial inverter 51.

Among the differential values in the differential value signal sent from the differentiation device 40, the partial inverter 51 compares the differential value phase corresponding to the cycled wave application signal generated during the first period and the differential value phase corresponding to the cycled wave application signal generated during the second period.

For example, in the case where the inclination change signal sent from the triangular driving generator 49 has a positive value, the partial inverter 51 inverts the polarity of the signal sent from the differentiation device 40 and sends the signal output from the partial inverter 51 to the integration device 43, when the signal sent from the crossing signal memory 50 is smaller than the signal sent from the differentiation device 40. In the case where the inclination change signal sent from the triangular driving generator 49 has a negative value, the partial inverter 51 inverts the polarity of a part of the signal sent from the differentiation device 40 and sends the signal output from the partial inverter 51 to the integration device 43, when the signal sent from the crossing signal memory 50 is larger than the signal sent from the differentiation device 40.

The integration device 43 integrates the value of the signal sent from the partial inverter 51 with the rotation phase of the information carrier 1, to generate a plurality of integral values. The integration device 43 sends a signal representing the plurality of integral values to the eccentricity driving generator 32.

Information carrier eccentricity correction processing performed using the information carrier apparatus 300 according to the third example of the present invention is substantially the same as the processing performed using the information carrier apparatus 100 except for the eccentricity direction detection processing performed using the eccentricity direction detection section 330, and therefore will not be described except for the eccentricity direction detection processing.

Figure 9:
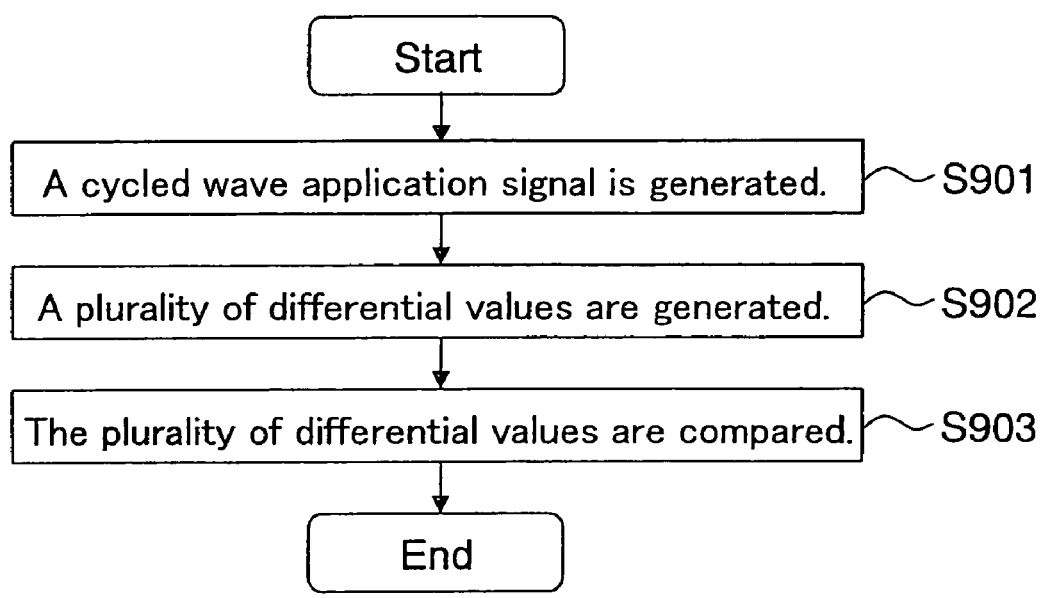
FIG. 9 is a flowchart illustrating eccentricity direction detection processing performed using an eccentricity direction detection section 330 included in the information carrier apparatus 300.
Figure 10:
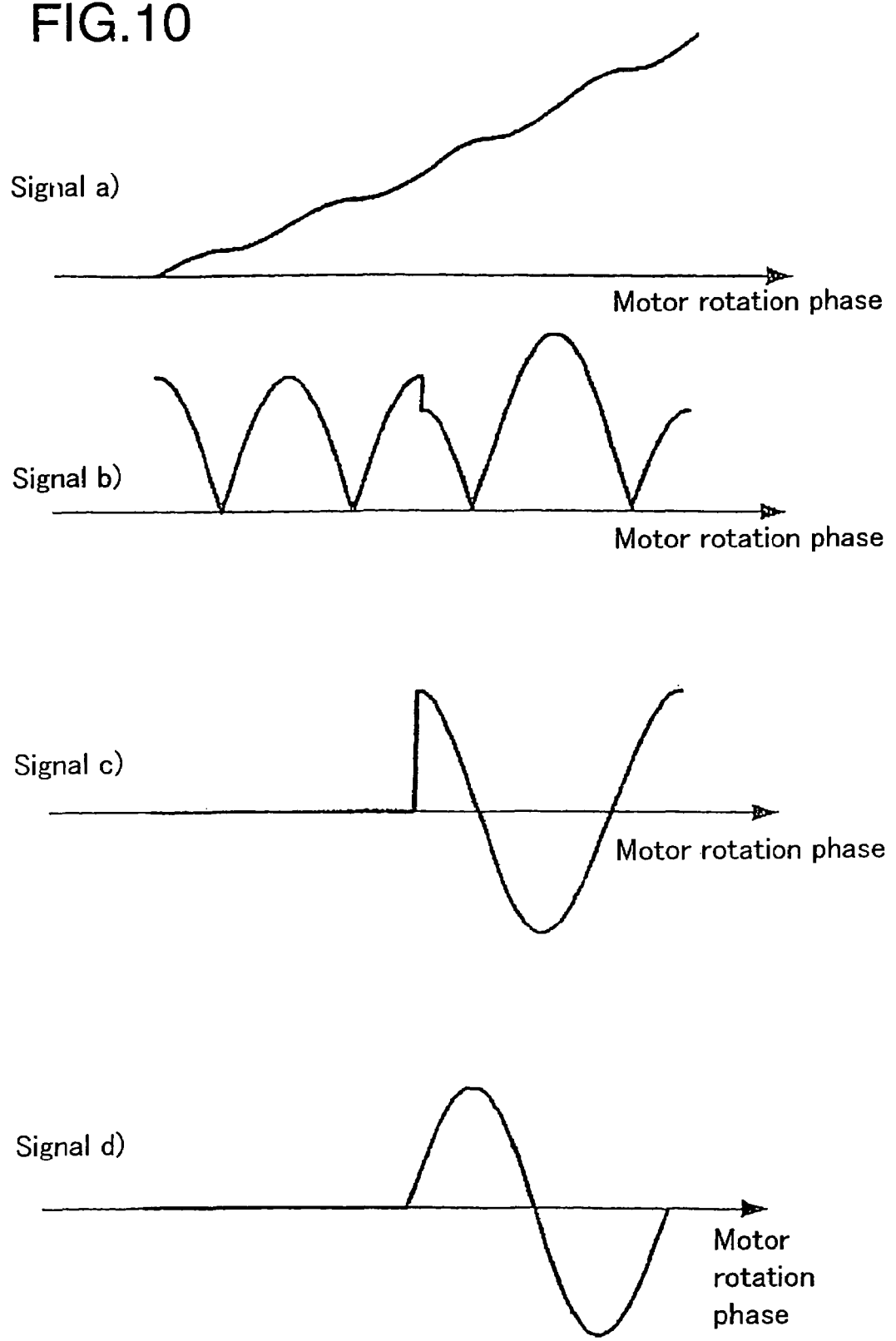
FIG. 10 shows signals processed during the eccentricity direction detection processing shown in FIG. 9.

FIG. 9 shows a flow of eccentricity direction detection processing performed by using the eccentricity direction detection section 330, and FIG. 10 shows signals processed during the eccentricity direction detection processing shown in FIG. 9. In FIG. 10, the horizontal axis represents the rotation phase of the motor 34, and the vertical axis represents the amplitude of the signals. In FIG. 10, signal a shows a signal to be input to the differentiation device 40. Signal b shows a signal output from the differentiation device 40. Signal a shows a signal output from the partial inverter 51. Signal d shows a signal output from the integration device 43.

Hereinafter, with reference to FIGS. 9 and 10, the eccentricity direction detection processing performed using the eccentricity direction detection section 330 will be described step by step.

Step S901: The eccentricity direction detection section 330 applies a first cycled wave signal to a times crossed relationship signal indicating the relationship between the number of times the optical beam has crossed the track and the rotation phase of the information carrier 1 during a first period, and applies a second cycled wave signal to the times crossed relationship signal during a second period, which is different from the first period. Thus, a cycled wave application signal is generated.

For example, while the motor 34 is performing two rotations, the eccentricity correction indicator 35 sends a signal indicating the eccentricity correction learning state to the eccentricity memory 33. At the same time, the eccentricity correction indicator 35 sends an output permission signal to the triangular driving generator 49. The triangular driving generator 49 sends a signal having an inclination of 0 to the adder 45 during the first rotation of the motor 34 and sends a signal having a positive inclination to the adder 45 during the second rotation of the motor 34. The triangular driving generator 49 sends a signal having an inclination of 0 to the partial inverter 51 during the first rotation of the motor 34 and sends a signal having a positive value corresponding to the inclination to the partial inverter 51 during the second rotation of the motor 34. The driving signal (a signal corresponding to an inclination which is sent from the triangular driving generator 49) is applied to the tracking actuator 15 via the adder 45.

Step S902: The eccentricity direction detection section 330 differentiates the value indicated by the cycled wave application signal with the rotation phase of the information carrier 1 to generate a plurality of differential values. This is performed by, for example, the differentiation device 40 by differentiating a value represented by signal a sent from the times crossed detection section 120 with the rotation phase of the information carrier 1. As a result, the differentiation device 40 outputs signal b (FIG. 10). Since the times crossed detection section 120 cannot detect the eccentricity direction of the information carrier 1, the value of signal b is entirely positive.

Step S903: Among the plurality of differential values, the eccentricity direction detection section 330 compares the differential value corresponding to the cycled wave application signal generated during the first period and the differential value corresponding to the cycled wave application signal generated during the second period.

For example, the inclination of the driving signal which is sent from the triangular driving generator 49 to the adder 45 changes from 0 to a positive value. Therefore, the differential of the track crossing amount in the positive direction of the signal sent from the differentiation device 40 is decreased during the second rotation as compared to that during the first rotation, and the differential of the track crossing amount in the negative direction of the signal sent from the differentiation device 40 is increased during the second rotation as compared to that during the first rotation. During the second rotation, the crossing signal memory 50 retains the track crossing signal during the first rotation. Therefore, the partial inverter 51 compares the differential value of the times track crossed signal, sent from the crossing signal memory 50 during the first rotation, and the differential value of the times track crossed signal, sent from the differentiation device 40 during the second rotation. When the differential value of the times track crossed signal sent from the differentiation device 40 is larger, the partial inverter 51 inverts the polarity of the signal value to generate signal c and sends signal c to the integration device 43 (FIG. 10).

The integration device 43 generates signal d including direction information by an integration operation and sends signal d to the eccentricity driving generator 32 (FIG. 10). Based on signal d, the eccentricity driving generator 32 generates a driving signal for correcting the eccentricity of the information carrier 1.

In the third example of the present invention, the first cycled wave and the second cycled wave are ramp waves having different inclinations from each other. The first cycle may be a sine wave having a first amplitude and the second cycle may be a sine wave having a second amplitude which is different from the first amplitude. The first cycle and the second cycle may be equal to the rotation cycle of the information carrier 1.

The first cycled wave and the second cycled wave may be continuous with each other at a zero-cross position. In this case, when the amplitude of the signal representing the first cycled wave and the amplitude of the signal representing the second cycled wave are zero, the first cycled wave and the second cycled wave are continuous with a prescribed rotation phase.

One of the amplitude of the first cycled wave and the amplitude of the second cycled wave may be zero.

As described above with reference to FIGS. 8 through 10, by applying a triangular wave signal having a different inclination for each rotation of the motor 34 to the tracking actuator 15, the direction in which the optical beam has crossed the track is determined based on the change in the track crossing amount in the same rotation phase. Accordingly, in the eccentricity correction learning state, the eccentricity direction of the information carrier 1 can be accurately detected, and a driving signal for correcting the eccentricity of the information carrier 1 can be generated without relying on the OFTR signal.

According to the present invention, the eccentricity direction of an information carrier can be detected based on the number of times that the optical head, which is structured to access the information carrier, has crossed the track. The eccentricity distance of the information carrier can be detected based on the number of times that the optical head has crossed the track and the eccentricity direction. The eccentricity of the information carrier is corrected based on the eccentricity direction and the eccentricity distance.

Since the eccentricity direction of the information carrier can be detected without relying on the information recorded on the information carrier, the eccentricity of the information carrier can be corrected even when the information carrier has no information recorded thereon.

In the example shown in FIG. 8, the TKC signal generator 30 and the times crossed detector 31 act as "a times crossed detection section for detecting the number of times that a head structured to access the information carrier has crossed the track". The eccentricity correction indicator 35, the triangular driving generator 49, the adder 45, the differentiation device 40, the crossing signal memory 50, the partial inverter 51 and the integration device 43 act as "an eccentricity direction detection section for detecting an eccentricity direction of the information carrier based on the number of times". The eccentricity driving generator 32 and the motor 34 act as "an eccentricity distance detection section for detecting an eccentricity distance of the information carrier based on the eccentricity direction and the number of times". The eccentricity memory 33 and the motor 34 act as "an eccentricity correction section for correcting eccentricity of the information carrier based on the eccentricity direction and the eccentricity distance". However, the elements included in the information carrier apparatus according to the present invention are not limited to those shown in FIG. 8.

The information carrier apparatus according to the present invention may have any structure as long as elements therein act as "a times crossed detection section for detecting the number of times that ahead structured to access the information carrier has crossed the track"; "an eccentricity direction detection section for detecting an eccentricity direction of the information carrier based on the number of times"; "an eccentricity distance detection section for detecting an eccentricity distance of the information carrier based on the eccentricity direction and the number of times"; and "an eccentricity correction section for correcting eccentricity of the information carrier based on the eccentricity direction and the eccentricity distance".

EXAMPLE 4

Figure 11:
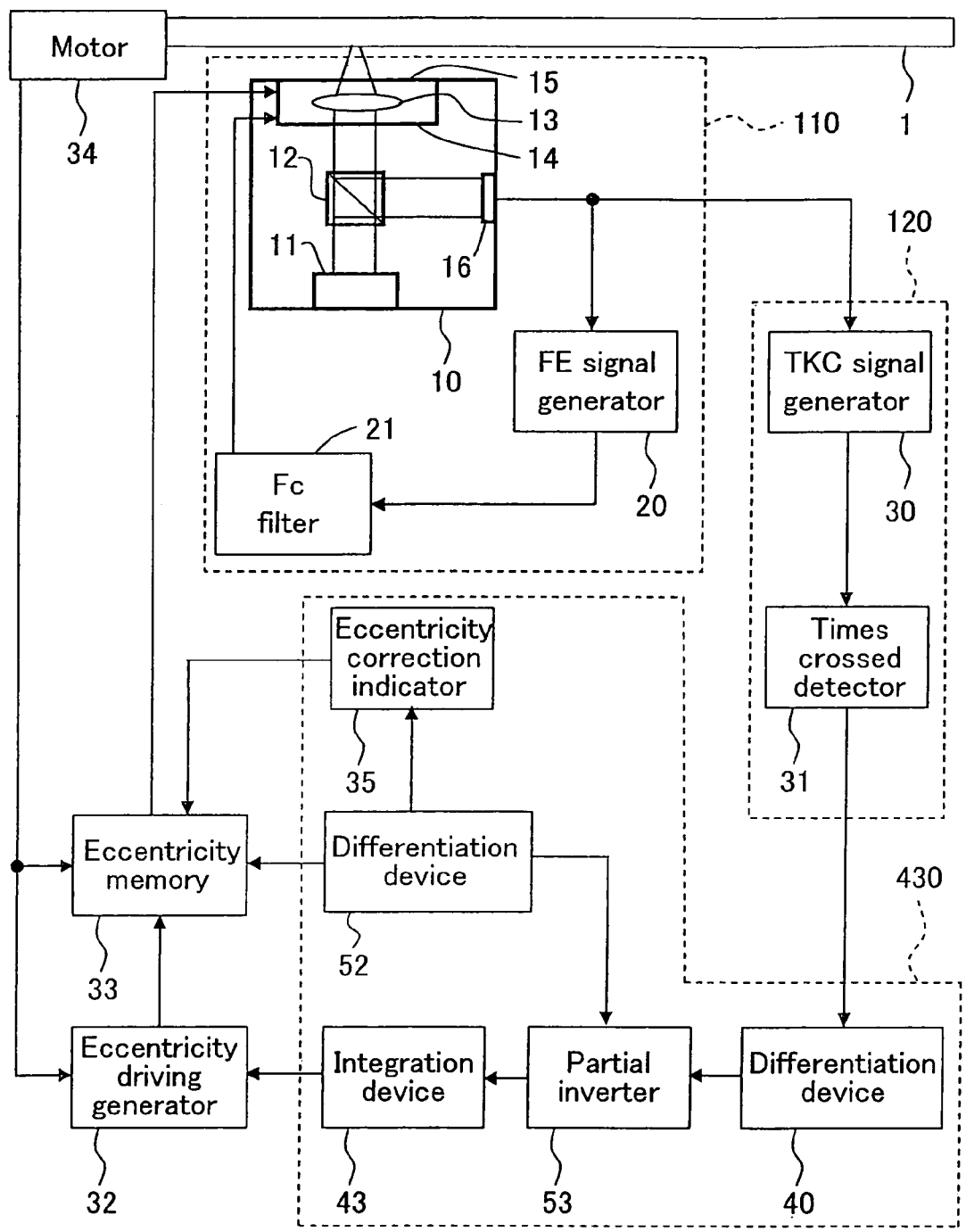
FIG. 11 shows a structure of an information carrier apparatus 400 according to a fourth example of the present invention.

FIG. 11 shows a structure of an information carrier apparatus 400 according to a fourth example of the present invention. Elements identical to those of the information carrier apparatus 100 shown in FIG. 1 will bear identical reference numerals thereto and will not be described in detail.

An eccentricity direction detection section 430 detects an eccentricity direction of the information carrier 1 based on the number of times that an optical head 10, structured to access the information carrier 1, has crossed the track. The eccentricity direction detection section 430 includes an eccentricity correction indicator 35, a differentiation device 40, a differentiation device 52, a partial inverter 53, and an integration device 43.

The eccentricity correction indicator 35 sends one of a signal indicating a no eccentricity correction state, a signal indicating an eccentricity correction learning state, and a signal indicating an eccentricity correction state to the eccentricity memory 33. The eccentricity memory 33 sends a driving signal to the differentiation device 52 in accordance with the rotation phase of the motor 34 without relying on a signal, sent from the eccentricity correction indicator 35, indicating the state regarding the eccentricity correction. The driving signal is a signal to be applied to the tracking actuator 15 for correcting the eccentricity based on an estimated eccentricity direction.

The differentiation device 52 differentiates a value represented by the driving signal with the rotation phase of the information carrier 1 to generate a differential value and sends a signal representing the differential value to the partial inverter 53.

The differentiation device 40 differentiates a value represented by a track crossing signal sent from the crossing number detector 31 with the rotation phase of the information carrier 1 to generate a differential value and sends a signal representing the differential value to the partial inverter 53.

The partial inverter 53 determines whether or not the estimated eccentricity direction is correct, based on a post-correction number of times. The post-correction number of times is the number of times that the optical head 10, structured to access the information carrier 1, has crossed the track after the eccentricity is corrected. A pre-correction number of times is the number of times that the optical head 10 has crossed the track before the eccentricity is corrected.

For example, the partial inverter 53 inverts the polarity of a part of the signal sent from the differentiation device 40 based on the difference between the signal representing the differential value sent from the differentiation device 40 and the signal representing the differential value sent from the differentiation device 52. Only when the difference between the inverted signal and the signal sent from the differentiation device 52 is equal to or smaller than a prescribed value (only when the estimated eccentricity direction is correct), the partial inverter 53 inverts a part of the signal sent from the differentiation device 40 and sends a signal output from the partial inverter 53 to the integration device 43. When the difference between the inverted signal and the signal sent from the differentiation device 52 is larger than a prescribed value (when the estimated eccentricity direction is incorrect), the partial inverter 53 modifies the inverted part of the signal sent from the differentiation device 40 and again compares the inverted signal and the signal sent from the differentiation device 52.

The integration device 43 integrates the value of the signal sent from the partial inverter 53 with the rotation phase of the information carrier 1 to generate a plurality of integral values. The integration device 43 sends a signal representing the plurality of integral values to the eccentricity driving generator 32.

Information carrier eccentricity correction processing performed using the information carrier apparatus 400 according to the fourth example of the present invention is substantially the same as the processing performed using the information carrier apparatus 100 except for the eccentricity direction detection processing performed using the eccentricity direction detection section 430, and therefore will not described except for the eccentricity direction detection processing.

Figure 12:
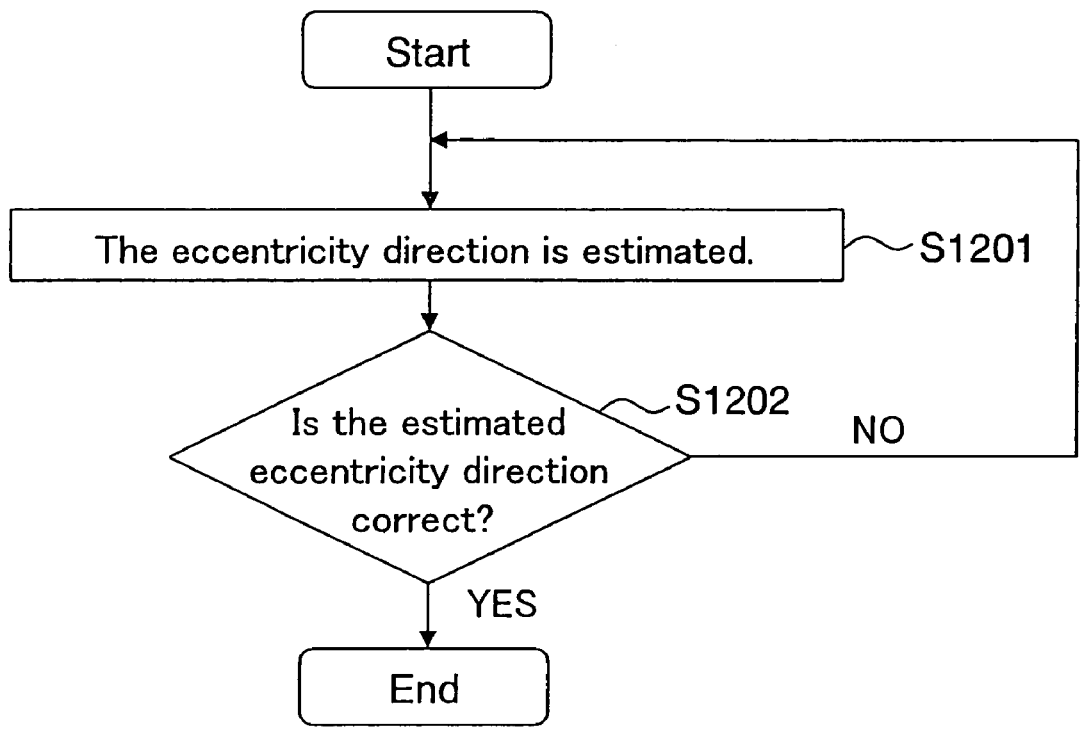
FIG. 12 is a flowchart illustrating eccentricity direction detection processing performed using an eccentricity direction detection section 430 included in the information carrier apparatus 400.
Figure 13:
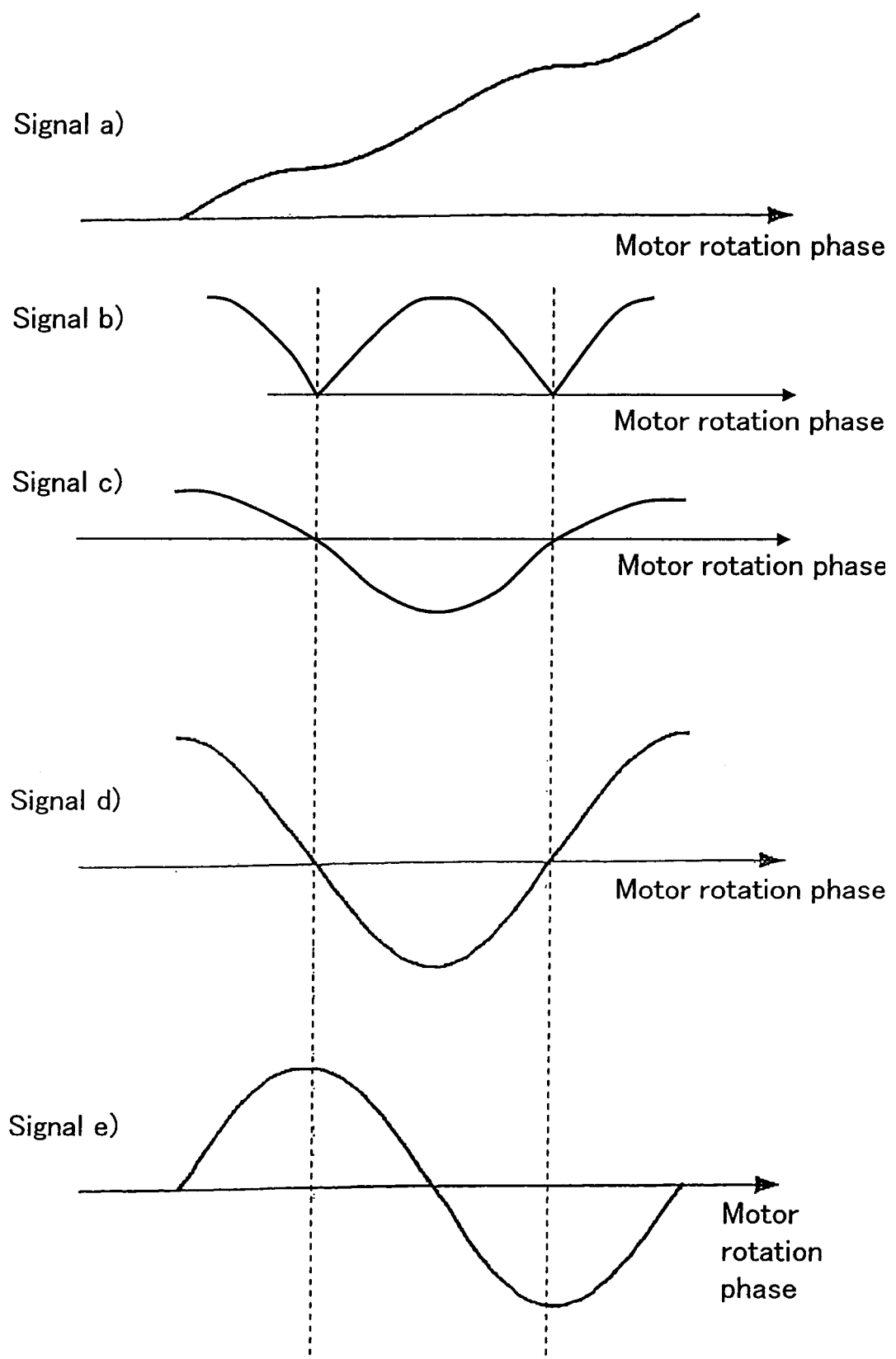
FIG. 13 shows signals processed during the eccentricity direction detection processing shown in FIG. 12.

FIG. 12 shows a flow of eccentricity direction detection processing performed by using the eccentricity direction detection section 430, and FIG. 13 shows signals processed during the eccentricity direction detection processing shown in FIG. 12. In FIG. 13, the horizontal axis represents the rotation phase of the motor 34, and the vertical axis represents the amplitude of the signals. In FIG. 13, signal a shows a signal to be input to the differentiation device 40. Signal b shows a signal output from the differentiation device 40. Signal C shows a signal output from the differentiation device 52. Signal d shows a signal output from the partial inverter 53. Signal e shows a signal output from the integration device 43.

Hereinafter, with reference to FIGS. 12 and 13, the eccentricity direction detection processing performed using the eccentricity direction detection section 430 will be described step by step.

Step S1201: The eccentricity direction detection section 430 estimates an eccentricity direction and corrects the eccentricity of the information carrier 1 based on a signal representing the estimated eccentricity direction.

The eccentricity of the information carrier 1 significantly varies in accordance with the characteristics of the information carrier 1 and the deviation amount of the information carrier 1 when the information carrier 1 is inserted into an information carrier apparatus. Therefore, the eccentricity of the information carrier 1 does not significantly change while the information carrier 1 is in the information carrier apparatus. Thus, a driving signal to be applied to the tracking actuator 15 for correcting the eccentricity once detected does not significantly change. For re-adjusting the eccentricity correction driving in order to improve the precision of the correction, the result of the eccentricity correction learning performed previously is updated.

Step S1202: Based on the post-correction number of times, the eccentricity direction detection section 430 determines whether or not the estimated eccentricity direction is correct.

For example, the partial inverter 53 inverts a part of the signal sent from the differentiation device 40 based on the difference between the signal indicating the differential value sent from the differentiation device 40 (signal b) and the signal indicating the differential value sent from the differentiation device 52 (signal c) (FIG. 13).

Only when the difference between the inverted signal and the signal sent from the differentiation device 52 is equal to or smaller than a prescribed value (only when the estimated eccentricity direction is correct), the eccentricity direction detection section 430 inverts a part of the signal sent from the differentiation device 40 and sends a signal output from the partial inverter 53 (signal d) to the integration device 43 (FIG. 13). When the difference between the inverted signal and the signal sent from the differentiation device 52 is larger than a prescribed value (when the estimated eccentricity direction is incorrect), the partial inverter 53 modifies the inverted part of the signal sent from the differentiation device 40 and again compares the inverted signal and the signal sent from the differentiation device 52.

As described above with reference to FIG. 11, the direction in which the optical head 10 crosses the track is determined based on the driving signal which is obtained by the eccentricity correction learning previously performed and is output in order to correct the eccentricity of the information carrier 1. Therefore, in the eccentricity correction learning state, the eccentricity direction of the information carrier 1 can be accurately detected, and a driving signal for correcting the eccentricity of the information carrier 1 can be newly generated.

Figure 14:
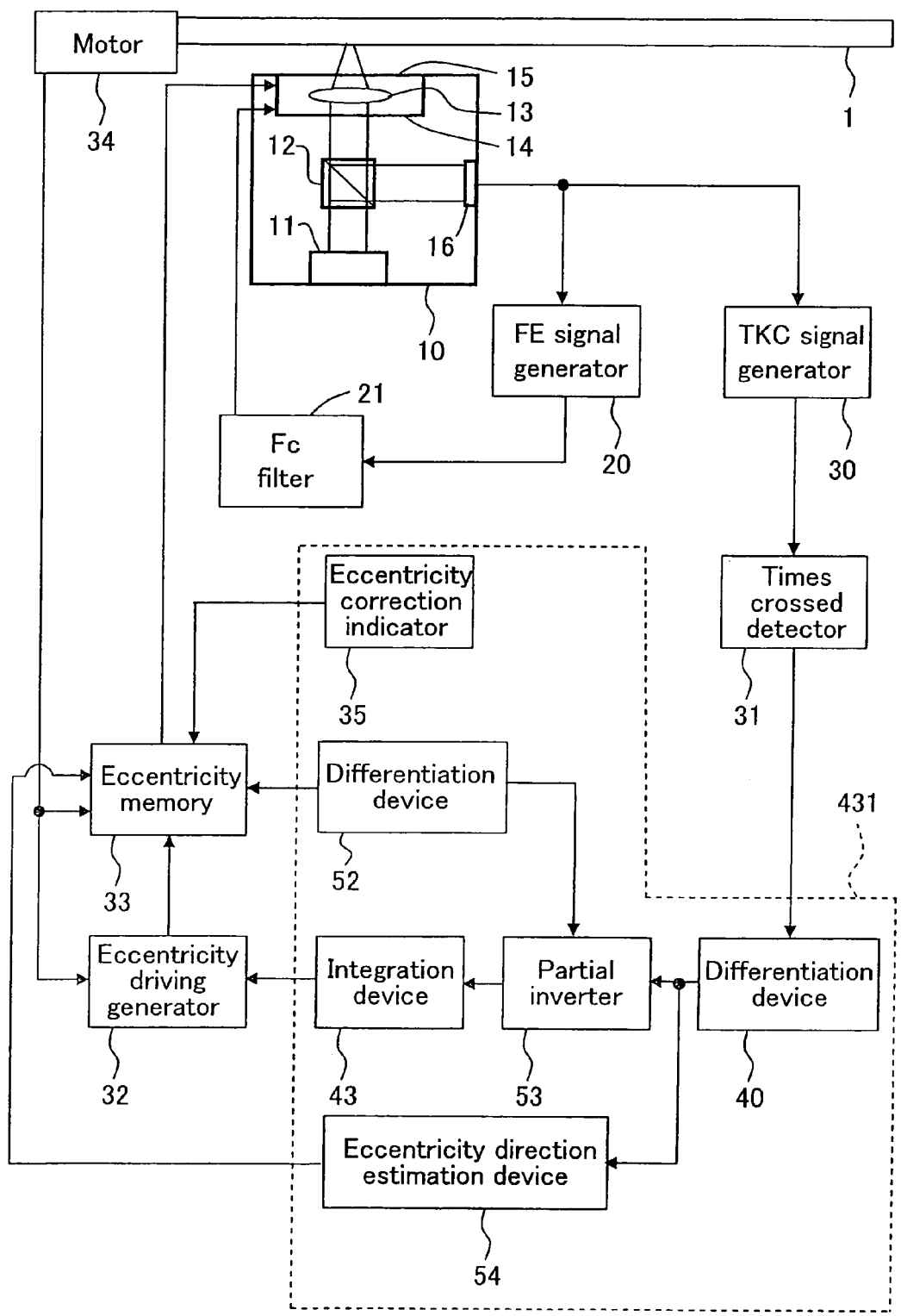
FIG. 14 shows a structure of another eccentricity direction detection section 431.

FIG. 14 shows another eccentricity direction detection section 431.

The eccentricity direction detection section 431 further includes an eccentricity direction estimation device 54.

The differentiation device 40 differentiates a value represented by a track crossing signal sent from the times crossed detector 31 with the rotation phase of the information carrier 1 to generate a differential value, and sends a signal representing the differential value to the partial inverter 53 and the eccentricity direction estimation device 54.

When the signal sent from the differentiation device 40 shows that the post-correction number of times is zero, the eccentricity direction estimation device 54 determines that the estimated eccentricity direction is correct. When the signal sent from the differentiation device 40 shows the post-correction number of times is not zero, the eccentricity direction estimation device 54 determines that the estimated eccentricity direction is incorrect. When the estimated eccentricity direction is determined as being incorrect, the eccentricity direction estimation device 54 generates a signal for modifying the estimated eccentricity direction and sends the signal to the eccentricity memory 33. The post-correction number of times is the number of times that the optical head 10 has crossed the track after the eccentricity is corrected based on the estimated eccentricity direction.

Figure 15:
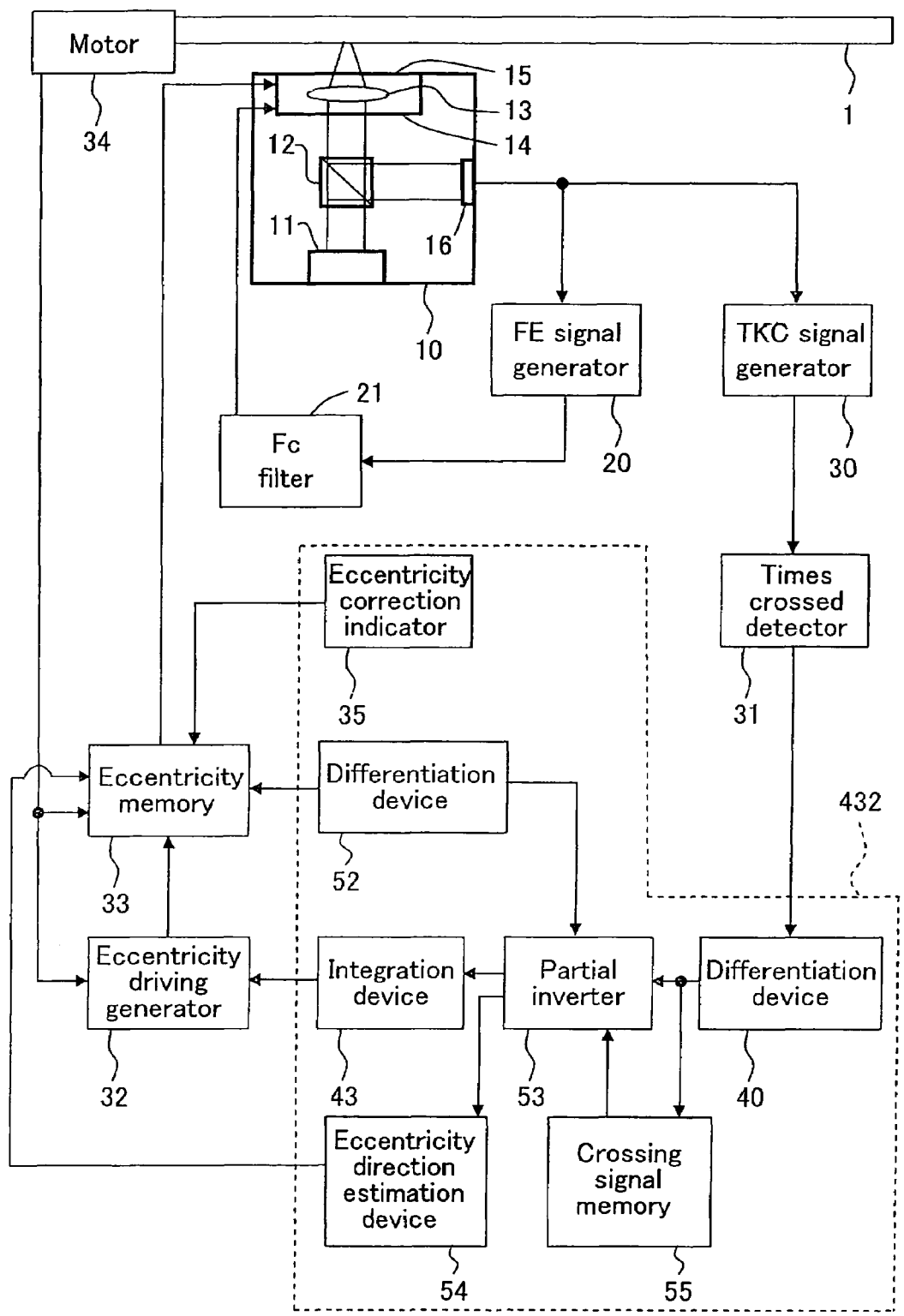
FIG. 15 shows a structure of still another eccentricity direction detection section 432.
Figure 16:
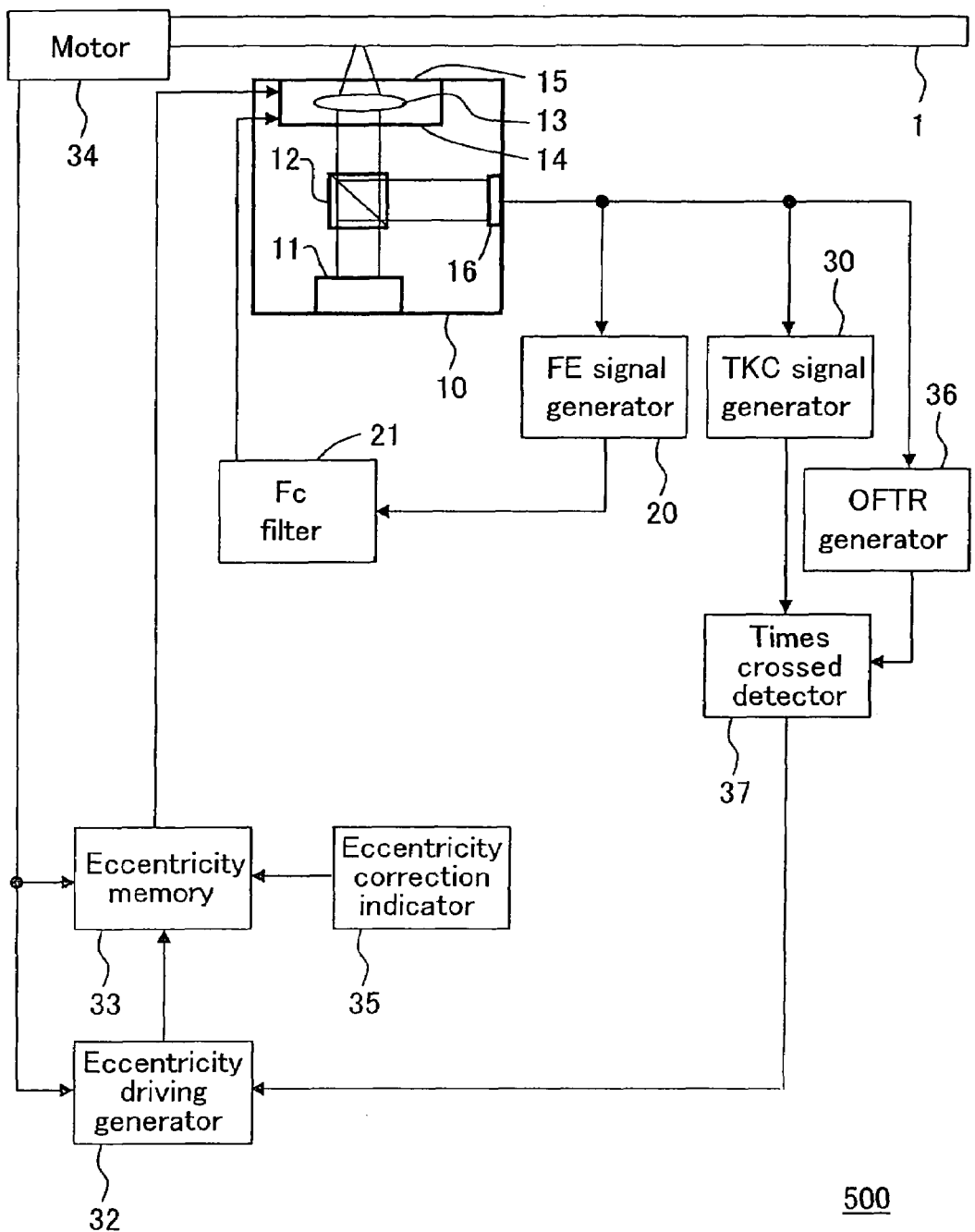
FIG. 16 shows a structure of a conventional information carrier apparatus 500.
Figure 17:
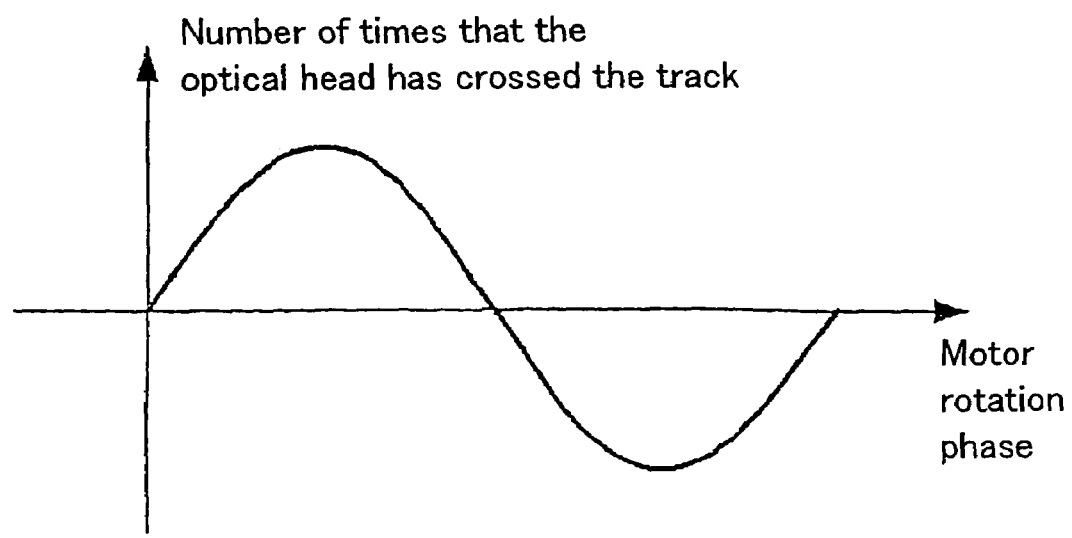
FIG. 17 shows a track crossing signal generated by a crossing detector in the conventional information carrier apparatus 500.
Figure 18:
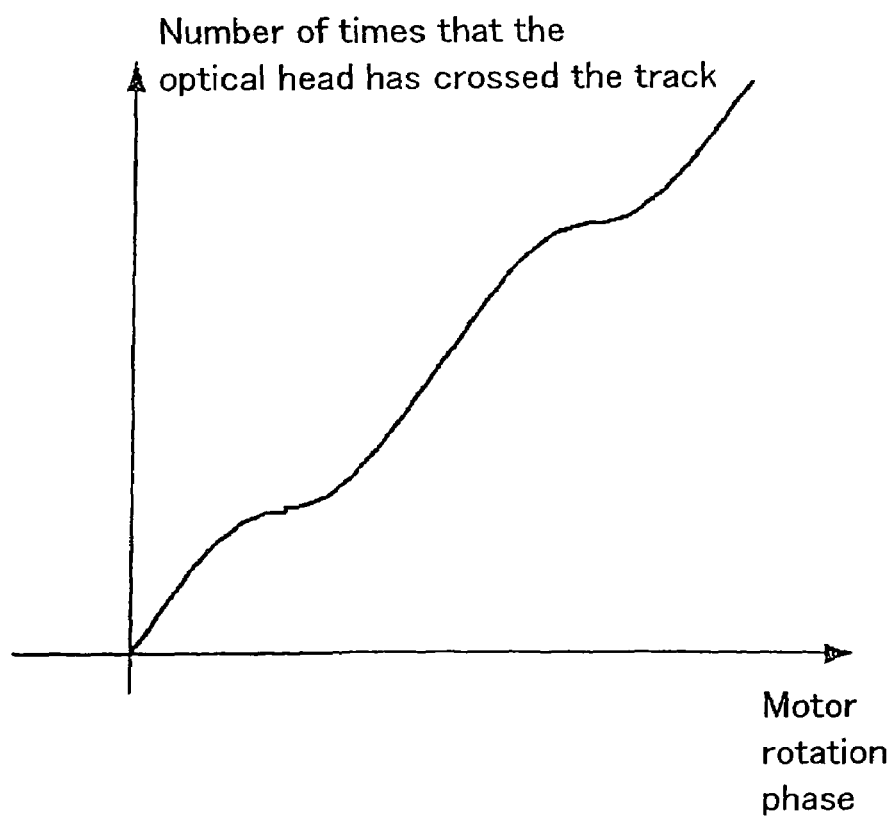
FIG. 18 is a track crossing signal generated by a crossing detector in the conventional information carrier apparatus 500 when an OFTR signal cannot be detected.

FIG. 15 shows still another eccentricity direction detection section 432.

The eccentricity direction detection section 432 further includes an eccentricity direction estimation device 54 and a crossing signal memory 55.

The differentiation device 40 differentiates a value represented by a pre-correction track crossing signal sent from the times crossed detector 31 with the rotation phase of the information carrier 1 to generate a differential value, and sends a signal representing the differential value to the partial inverter 53 and the crossing signal memory 55. The pre-correction number of times is the number of times that the optical head 10, which is structured to access the information carrier, has crossed the track before the eccentricity is corrected based on the estimated eccentricity direction. A pre-correction times crossed relationship signal shows the relationship between the pre-correction number of times and the rotation phase of the information carrier 1.

The crossing signal memory 55 stores the signal sent from the differentiation device 40 (signal A).

The differentiation device 40 further differentiates a value represented by a post-correction track crossing signal sent from the times crossed detector 31 with the rotation phase of the information carrier 1 to generate a differential value, and sends a signal representing the differential value (signal B) to the partial inverter 53. A post-correction number of times is the number of times that the optical head 10, which is structured to access the information carrier, has crossed the track after the eccentricity is corrected. A post-correction times crossed relationship signal represents the relationship between the post-correction number of times and the rotation phase of the information carrier 1.

The crossing signal memory 55 sends signal A to the partial inverter 53.

The partial inverter 53 compares signal A and signal B to determine whether or not the estimated eccentricity direction is correct.

When the partial inverter 53 determines that the estimated eccentricity direction is incorrect, the partial inverter 53 sends a signal indicating that the estimated eccentricity direction is incorrect to the eccentricity direction estimation device 54.

The eccentricity direction estimation device 54 generates a signal for modifying the estimated eccentricity direction, and sends the signal to the eccentricity memory 33.

According to the present invention, the eccentricity direction can be detected based on the number of times that the optical head, structured to access the information carrier, has crossed the track. The eccentricity distance of the information carrier can be detected based on the number of times that the optical head has crossed the track and the eccentricity direction. The eccentricity of the information carrier is corrected based on the eccentricity direction and the eccentricity distance.

Since the eccentricity direction of the information carrier can be detected without relying on the information recorded on the information carrier, the eccentricity of the information carrier can be corrected even when the information carrier has no information recorded thereon.

In the fourth example, the eccentricity direction of the information is determined based on the result of eccentricity correction learning before the eccentricity correction. Alternatively, a sine wave may be generated using the direction in which the center of gravity of the information carrier is deviated as long as an approximate eccentricity direction is clear.

In the fourth example of the present invention, a track crossing signal corresponding to one rotation of the information carrier 1 is described. In order to detect the track crossing signal more stably, a track crossing signal corresponding to a plurality of rotations of the information carrier 1 may be detected so that the track crossing signal can be averaged for each rotation phase of the motor 34.

In the example shown in FIG. 11, the TKC signal generator 30 and the times crossed detector 31 act as "a times crossed detection section for detecting the number of times that a head structured to access the information carrier has crossed the track". The eccentricity correction indicator 35, the differentiation device 40, the differentiation device 52, the partial inverter 53 and the integration device 43 act as "an eccentricity direction detection section for detecting an eccentricity direction of the information carrier based on the number of times". The eccentricity driving generator 32 and the motor 34 act as "an eccentricity distance detection section for detecting an eccentricity distance of the information carrier based on the eccentricity direction and the number of times". The eccentricity memory 33 and the motor 34 act as "an eccentricity correction section for correcting eccentricity of the information carrier based on the eccentricity direction and the eccentricity distance". However, the elements included in the information carrier apparatus according to the present invention are not limited to those shown in FIG. 11.

The information carrier apparatus according to the present invention may have any structure as long as elements therein act as "a times crossed detection section for detecting the number of times that a head structured to access the information carrier has crossed the track"; "an eccentricity direction detection section for detecting an eccentricity direction of the information carrier based on the number of times"; "an eccentricity distance detection section for detecting an eccentricity distance of the information carrier based on the eccentricity direction and the number of times"; and "an eccentricity correction section for correcting eccentricity of the information carrier based on the eccentricity direction and the eccentricity distance".

In the first through fourth examples, the information carrier 1 is, for example, a circular optical disc. A circular disc has a spiral or concentric track(s). The number of times that the optical head, structured to access the circular optical disc, has crossed the track is detectable based on, for example, the light amount of an optical beam directed to and then reflected by the optical disc.

The information carrier according to the present invention is not limited to an optical disc or to being circular, as long as the number of times that the head, structured to access the information carrier, has crossed the track is detectable. Any rotatable information carrier having a track(s) formed therein is usable. The information carrier usable in the present invention maybe, for example, a magnetic disc and quadrangular. The number of times that the head, structured to access the magnetic disc, has crossed the track is detectable based on, for example, the change in the magnetic field of the magnetic disc.

In the first through fourth examples, the eccentricity correction section may correct the eccentricity before or after the tracking control of the information carrier apparatus is transferred from an inoperative state to an operative state.

The times crossed detection section included in the information carrier apparatus in the first through fourth examples of the present invention may include a noise removing section for removing noise from a times crossed relationship signal. The noise removed by the noise removing section has a frequency which is twice or more the rotation frequency of the information carrier.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information carrier apparatus for accessing an information carrier having at least one track formed therein, the information carrier apparatus comprising:
    a times crossed detection section for detecting the number of times that a head structured to access the information carrier has crossed the track;
    an eccentricity direction detection section for detecting an eccentricity direction of the information carrier based on the number of times;
    an eccentricity distance detection section for detecting an eccentricity distance of the information carrier based on the eccentricity direction and the number of times; and
    an eccentricity correction section for correcting eccentricity of the information carrier based on the eccentricity direction and the eccentricity distance,
    wherein the eccentricity direction detection section includes:
    a ramp wave application signal generation section for generating a ramp wave application signal by applying a ramp wave signal to a times crossed relationship signal which represents the relationship between the number of times and a rotation phase of the information carrier;
    a differential value generation section for generating a plurality of differential values by differentiating a value represented by the ramp wave application signal with the rotation phase; and
    a differential value comparison section for comparing the plurality of differential values, and
    wherein the eccentricity direction of the information carrier is detected based on the comparison result of the plurality of differential values.

2. An information carrier apparatus according to claim 1, wherein:
    the information carrier apparatus accesses the information carrier by movement of the head; and
    the ramp wave signal is applied to the times crossed relationship signal in accordance with the movement of the head.

3. An information carrier apparatus according to claim 1, wherein the differential value comparison section includes:
    a section for dividing a range of the rotation phase into a plurality of rotation phase ranges based on the plurality of differential values; and
    a section for generating a plurality of sums by calculating a sum of the differential values for each of the plurality of rotation phase ranges;
    wherein the differential value comparison section compares the plurality of sums and detects the eccentricity direction of the information carrier based on the comparison result of the plurality of sums.

4. An information carrier apparatus according to claim 3, wherein the differential value comparison section further includes a section for inverting the polarity of the differential values corresponding to at least one of the plurality of rotation phase ranges based on the comparison result of the plurality of sums.

5. An information carrier apparatus according to claim 1, wherein:
    the differential value comparison section includes a section for detecting a plurality of maximum values included in the plurality of differential values; and
    the differential value comparison section compares the plurality of maximum values and detects the eccentricity direction of the information carrier based on the comparison result of the plurality of maximum values.

6. An information carrier apparatus according to claim 5, wherein the differential value comparison section further includes:
    a section for dividing a range of the rotation phase into a plurality of rotation phase ranges based on the plurality of differential values; and
    a section for inverting the polarity of the differential values corresponding to at least one of the plurality of rotation phase ranges based on the comparison result of the plurality of maximum values.

7. An information carrier apparatus according to claim 1, wherein the eccentricity direction detection section includes:
    a section for detecting a plurality of minimum values included in the plurality of differential values; and
    a section for dividing a range of the rotation phase into a plurality of rotation phase ranges based on the plurality of minimum values.

8. An information carrier apparatus according to claim 1, wherein the eccentricity direction detection section includes:
    a section for detecting a plurality of maximum values included in the plurality of differential values; and
    a section for dividing a range of the rotation phase into a plurality of rotation phase ranges based on the plurality of maximum values.

9. An information carrier according to claim 1, wherein the eccentricity correction section corrects the eccentricity before tracking control of the information carrier apparatus is transferred from an inoperative state to an operative state.

10. An information carrier according to claim 1, wherein the eccentricity correction section corrects the eccentricity after tracking control of the information carrier apparatus is transferred from an inoperative state to an operative state.

11. An information carrier correction method for correcting eccentricity of an information carrier having at least one track formed therein, the information carrier correction method comprising the steps of:

(a) detecting the number of times that a head, structured to access the information carrier, has crossed the track;
(b) detecting an eccentricity direction of the information carrier based on the number of times;
(c) detecting an eccentricity distance of the information carrier based on the eccentricity direction and the number of times; and
(d) correcting eccentricity of the information carrier based on the eccentricity direction and the eccentricity distance, wherein step (b) includes the steps of:

(b1-1) generating a ramp wave application signal by applying a ramp wave signal to a times crossed relationship signal which represents the relationship between the number of times and a rotation phase of the information carrier;

(b1-2) generating a plurality of differential values by differentiating a value represented by the ramp wave application signal with the rotation phase; and (b1-3) comparing the plurality of differential values, and wherein the eccentricity direction of the information carrier is detected based on the comparison result of the plurality of differential values.

* * * * *

UNITED STATES PATENT AND TRADEMARK OFFICE
CERTIFICATE OF CORRECTION

PATENT NO. : 7,450,483 B2  Page 1 of 1
APPLICATION NO. : 10/818142
DATED : November 11, 2008
INVENTOR(S) : Kenji Fujiune It is certified that error appears in the above-identified patent and that said Letters Patent is hereby corrected as shown below:

Title Page, Item [56] under "FOREIGN PATENT DOCUMENTS",
 "2/2001" should read -- 11/2001 --;
 "12/2001" should read -- 6/2001 --; and
 "6/2002" should read -- 9/2002 --.

Signed and Sealed this

Sixteenth Day of June, 2009

JOHN DOLL
*Acting Director of the United States Patent and Trademark Office*